United States Patent
Ahn et al.

(10) Patent No.: US 11,943,750 B2
(45) Date of Patent: Mar. 26, 2024

(54) WIRELESS COMMUNICATION METHOD AND WIRELESS COMMUNICATION DEVICE FOR BROADBAND LINK CONFIGURATION

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/092,215

(22) Filed: Dec. 31, 2022

(65) Prior Publication Data
US 2023/0132908 A1    May 4, 2023

Related U.S. Application Data

(63) Continuation of application No. 16/988,596, filed on Aug. 8, 2020, now Pat. No. 11,576,152, which is a
(Continued)

(30) Foreign Application Priority Data

May 26, 2014  (KR) .................... 10-2014-0063356
May 26, 2014  (KR) .................... 10-2014-0063359
Oct. 29, 2014  (KR) .................... 10-2014-0148477

(51) Int. Cl.
*H04W 72/04*     (2023.01)
*H04W 72/0453*   (2023.01)
*H04W 74/08*     (2009.01)

(52) U.S. Cl.
CPC ....... *H04W 72/04* (2013.01); *H04W 72/0453* (2013.01); *H04W 74/0808* (2013.01);
(Continued)

(58) Field of Classification Search
CPC ............ H04W 72/04; H04W 72/0453; H04W 74/0808; H04W 74/085; H04W 74/0858; H04W 74/0816
See application file for complete search history.

(56) References Cited

U.S. PATENT DOCUMENTS 7,133,422 B2 * 11/2006 Liu ................. H04W 8/04
                                                        370/503
8,385,272 B2 *  2/2013 Gaur .............. H04W 74/0866
                                                        370/329
(Continued)

FOREIGN PATENT DOCUMENTS

KR    10-2004-0055517    6/2004
KR    10-2004-0083787    10/2004
(Continued)

OTHER PUBLICATIONS

International Search Report for PCT/KR2015/005266 dated Sep. 17, 2015 and its English translation from WIPO.
(Continued)

*Primary Examiner* — Raj Jain
(74) *Attorney, Agent, or Firm* — Ladas & Parry, LLP

(57) ABSTRACT

The present invention relates to a wireless communication method and a wireless communication terminal for wideband link setup, and more particularly, to a wireless communication method and a wireless communication terminal for
(Continued)

increasing data communication efficiency by extending a data transmission bandwidth of a terminal.

To this end, provided are a wireless communication method of a terminal, including: obtaining first primary channel information of a basic service set (BSS) with which the terminal is associated; performing clear channel assessment (CCA) for one or more secondary channels of the BSS; and setting a second primary channel among one or more secondary channels determined to be idle based on a result of the CCA, and a wireless communication terminal using the same.

11 Claims, 26 Drawing Sheets

Related U.S. Application Data continuation of application No. 15/313,105, filed as application No. PCT/KR2015/005266 on May 26, 2015, now Pat. No. 10,743,289.

(52) U.S. Cl.
CPC ..... *H04W 74/085* (2013.01); *H04W 74/0858* (2013.01); *H04W 74/0816* (2013.01)

(56) References Cited

U.S. PATENT DOCUMENTS

| | | | |
|---|---|---|---|
| 8,634,317 | B1 | 1/2014 | Yu |
| 8,837,515 | B1* | 9/2014 | Cai ................... H04W 74/0825 370/445 |
| 9,264,908 | B2 | 2/2016 | Park et al. |
| 10,743,289 | B2* | 8/2020 | Ahn .................... H04W 74/085 |
| 11,576,152 | B2* | 2/2023 | Ahn .................... H04W 74/0858 |
| 2008/0316955 | A1 | 12/2008 | Yu |
| 2012/0155295 | A1 | 6/2012 | Trainin |
| 2012/0163331 | A1 | 6/2012 | Chan et al. |
| 2012/0213204 | A1 | 8/2012 | Noh et al. |
| 2014/0050156 | A1 | 2/2014 | Chan et al. |
| 2014/0079003 | A1 | 3/2014 | Noh et al. |
| 2014/0112273 | A1 | 4/2014 | Aboul-Magd et al. |
| 2014/0241257 | A1 | 8/2014 | Ding et al. |
| 2014/0328195 | A1 | 11/2014 | Sampath et al. |
| 2014/0355534 | A1 | 12/2014 | Vermani et al. |
| 2015/0009989 | A1* | 1/2015 | Han ........................ H04L 41/30 370/390 |
| 2015/0373685 | A1 | 12/2015 | Seok |
| 2016/0081010 | A1 | 3/2016 | Seok |
| 2016/0174079 | A1 | 6/2016 | Wang et al. |
| 2017/0171773 | A1* | 6/2017 | Cariou .............. H04W 74/0841 |
| 2017/0188336 | A1* | 6/2017 | Ahn ...................... H04W 72/04 |
| 2017/0202019 | A1 | 7/2017 | You et al. |
| 2020/0374841 | A1* | 11/2020 | Ahn .................. H04W 74/0808 |
| 2023/0132908 | A1* | 5/2023 | Ahn .................. H04W 72/0453 370/329 |

FOREIGN PATENT DOCUMENTS

| | | |
|---|---|---|
| KR | 10-2009-0084407 | 8/2009 |
| KR | 10-2010-0004039 | 1/2010 |
| KR | 10-2013-0074139 | 7/2013 |
| KR | 10-2015-0090051 | 8/2015 |
| WO | 2014/112707 | 7/2014 |
| WO | 2014/123349 | 8/2014 |

OTHER PUBLICATIONS

Written Opinion of the International Searching Authority for PCT/KR2015/005266 dated Sep. 17, 2015 and its English machine translation by Google Translate.

Office Action dated Jun. 26, 2018 for U.S. Appl. No. 15/523,672 (published as US 2017/0338935).

Office Action dated Dec. 28, 2018 for U.S. Appl. No. 15/523,672 (published as US 2017/0338935).

Advisory Action dated Apr. 9, 2019 for U.S. Appl. No. 15/523,672 (published as US 2017/0338935).

Notice of Allowance dated Jul. 10, 2019 for U.S. Appl. No. 15/523,672 (published as US 2017/0338935).

International Preliminary Report on Patentability (Chapter I) for PCT/KR2015/005266 dated Nov. 29, 2016 and its English translation from WIPO.

Notice of Allowance dated Apr. 6, 2020 for U.S. Appl. No. 15/313,105 (published as US 2017/0188336).

Office Action dated Sep. 6, 2019 for U.S. Appl. No. 15/313,105 (published as US 2017/0188336).

Advisory Action dated Jul. 1, 2019 for U.S. Appl. No. 15/313,105 (published as US 2017/0188336).

Final Office Action dated Mar. 19, 2019 for U.S. Appl. No. 15/313,105 (published as US 2017/0188336).

Office Action dated Jun. 25, 2018 for U.S. Appl. No. 15/313,105 (published as US 2017/0188336).

Office Action dated Sep. 28, 2022 for Korean Patent Application No. 10-2022-7026191 and its English translation provided by Applicant's foreign counsel.

Notice of Allowance dated Apr. 27, 2021 for Korean Patent Application No. 10-2021-7030525 and its English translation provided by Applicant's foreign counsel.

International Preliminary Report on Patentability (Chapter I) for PCT/KR2015/011511 dated May 2, 2017 and its English translation from WIPO.

International Search Report for PCT/KR2015/011511 dated Mar. 31, 2016 and its English translation from WIPO.

Written Opinion of the International Searching Authority for PCT/KR2015/011511 dated Mar. 31, 2016 and its English translation from WIPO.

Office Action dated Dec. 16, 2020 for Korean Patent Application No. 10-2016-7031979 and its English translation provided by Applicant's foreign counsel.

Notice of Allowance dated Jun. 23, 2021 for Korean Patent Application No. 10-2016-7031979 and its English translation provided by Applicant's foreign counsel.

Notice of Allowance dated Oct. 21, 2019 for U.S. Appl. No. 15/523,672.

Notice of Allowance dated Sep. 27, 2022 for U.S. Appl. No. 16/988,596 (published as US 2020/0374841).

Office Action dated Apr. 18, 2022 for U.S. Appl. No. 16/988,596 (published as US 2020/0374841).

* cited by examiner

WIRELESS COMMUNICATION METHOD AND WIRELESS COMMUNICATION DEVICE FOR BROADBAND LINK CONFIGURATION

CROSS-REFERENCE TO RELATED APPLICATIONS

This application is a continuation of U.S. patent application Ser. No. 16/988,596 filed on Aug. 8, 2020, which is a continuation of U.S. patent application Ser. No. 15/313,105 filed on Nov. 22, 2016, issued as U.S. Pat. No. 10,743,289 dated Aug. 11, 2022, which is the U.S. National Stage of International Patent Application No. PCT/KR2015/005266 filed on May 26, 2015, which claims the priority to Korean Patent Application No. 10-2014-0063356 filed in the Korean Intellectual Property Office on May 26, 2014, Korean Patent Application No. 10-2014-0063359 filed in the Korean Intellectual Property Office on May 26, 2014, and Korean Patent Application No. 10-2014-0148477 filed in the Korean Intellectual Property Office on Oct. 29, 2014, the entire contents of which are incorporated herein by reference.

TECHNICAL FIELD

The present invention relates to a wireless communication method and a wireless communication terminal for wideband link setup, and more particularly, to a wireless communication method and a wireless communication terminal for increasing data communication efficiency by extending a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has been made in an effort to provide a high-efficiency/high-performance wireless LAN communication in a high-density environment.

In particular, the present invention has been made in an effort to provide a method for allocating a wideband channel for transmitting data in order to improve communication efficiency.

The present invention has also been made in an effort to guarantee fairness of a communication opportunity between a terminal using the wideband channel and another terminal.

Technical Solution

In order to achieve the objects, the present invention provides a wireless communication method and a wireless communication terminal as below.

First, an exemplary embodiment of the present invention provides a wireless communication method of a terminal, including: obtaining first primary channel information of a basic service set (BSS) with which the terminal is associated; performing clear channel assessment (CCA) for one or more secondary channels of the BSS; and setting a second primary channel among the one or more secondary channels determined to be idle based on a result of the CCA.

Another exemplary embodiment of the present invention provides a wireless communication terminal including: a transceiver transmitting and receiving a radio signal; and a processor controlling an operation of the terminal, wherein the processor obtains first primary channel information of a basic service set (BSS) with which the terminal is associated, performs clear channel assessment (CCA) for one or more secondary channels of the BSS, and sets a second primary channel among one or more secondary channels determined to be idle based on a result of the CCA.

According to an exemplary embodiment, the second primary channel may be randomly set among the one or more idle secondary channels.

According to another exemplary embodiment, a secondary channel, among the one or more idle secondary channels, which forms a channel having the largest bandwidth in association with another idle secondary channel(s) may be set as the second primary channel.

According to yet another exemplary embodiment, the second primary channel may be set based on a frequency interval between each of the idle secondary channels and the first primary channel.

According to still yet another exemplary embodiment, a secondary channel, among the one or more idle secondary channels, having the highest order of association with the first primary channel when applying a bandwidth extension for wideband data transmission may be set as the second primary channel.

In this case, the first primary channel may be set common to (i.e. identically for) each terminal in the BSS and the second primary channel may be set independently for each terminal in the BSS.

Next, another exemplary embodiment of the present invention provides a wireless communication method of a terminal, including: obtaining first primary channel information of a basic service set (BSS) with which the terminal is associated; obtaining second primary channel information set for the terminal, the second primary channel being set among at least one of the secondary channels of the BSS; performing a backoff procedure for the first primary channel; performing clear channel assessment (CCA) for the second primary channel for a predetermined time before a backoff counter of the backoff procedure is expired; and transmitting data by using both the first primary channel and the second primary channel when the second primary channel is idle as a result of performing the CCA.

Another exemplary embodiment of the present invention provides a wireless communication terminal including: a transceiver transmitting and receiving a radio signal; and a processor controlling an operation of the terminal, wherein the processor obtains first primary channel information of a basic service set (BSS) with which the terminal is associated, obtains second primary channel information set for the terminal, in which the second primary channel is set among at least one of the secondary channels of the BSS, performs a backoff procedure for the first primary channel, performs clear channel assessment (CCA) for the second primary channel for a predetermined time before a backoff counter of the backoff procedure is expired and transmits data by using both the first primary channel and the second primary channel when the second primary channel is idle as a result of performing the CCA.

In this case, clear channel assessment (CCA) for secondary channels of the BSS may be further performed for a predetermined time before the backoff counter of the backoff procedure is expired and when the second primary channel is idle and at least one idle secondary channel which can be associated with the second primary channel is present as a result of performing the CCA, the data may be transmitted through a wideband channel in which the second primary channel and the idle secondary channel are associated with each other.

Next, yet another exemplary embodiment of the present invention provides a wireless communication method of a terminal, including: obtaining first primary channel information of a basic service set (BSS) with which the terminal is associated; obtaining second primary channel information set for the terminal, the second primary channel being set among at least one of the secondary channels of the BSS; performing a backoff procedure for each of the first primary channel and the second primary channel; and transmitting data by using at least one channel between the first primary channel and the second primary channel in which a backoff counter of the backoff procedure is expired.

Yet another exemplary embodiment of the present invention provides a wireless communication terminal including: a transceiver transmitting and receiving a radio signal; and a processor controlling an operation of the terminal, wherein the processor obtains first primary channel information of a basic service set (BSS) with which the terminal is associated, obtains second primary channel information set for the terminal, in which the second primary channel is set among at least one of the secondary channels of the BSS, performs a backoff procedure for each of the first primary channel and the second primary channel and transmits data by using at least one channel between the first primary channel and the second primary channel in which a backoff counter of the backoff procedure is expired.

According to an exemplary embodiment, a second backoff counter for the backoff procedure of the second primary channel may be set equal to a first backoff counter for the backoff procedure of the first primary channel.

In this case, when the backoff procedure of the first primary channel is suspended, the backoff procedure of the second primary channel may be simultaneously suspended during the suspension period of the backoff procedure of the first primary channel and when the second primary channel is continuously maintained to be idle while the backoff procedure of the second primary channel is performed, the data may be transmitted by using the second primary channel.

According to another exemplary embodiment, each of a first backoff counter for the backoff procedure of the first primary channel and a second backoff counter for the backoff procedure of the second primary channel may be set independently from each other.

In this case, when the second backoff counter is expired earlier than the first backoff counter, the terminal may defer transmitting the data by using the second primary channel until the first backoff counter is expired and when the first backoff counter is expired, the terminal may transmit the data by using both the first primary channel and the second primary channel.

According to yet another exemplary embodiment, the backoff procedure of the first primary channel and the backoff procedure of the second primary channel may be performed by using a common backoff counter, and the common backoff counter may be suspended when both the first primary channel and the second primary channel are busy.

In this case, when the common backoff counter is expired, the data may be transmitted by using at least one channel between the first primary channel and the second primary channel which is idle.

According to the exemplary embodiment, the clear channel assessment (CCA) for secondary channels of the BSS may be further performed for a predetermined time before the backoff counter of the backoff procedure of the second primary channel is expired and when at least one idle secondary channel which can be associated with the second primary channel is present as a result of performing the CCA, the data may be transmitted through a wideband channel in which the second primary channel and the idle secondary channel are associated with each other.

Still yet another exemplary embodiment of the present invention provides a wireless communication method of a terminal, including: obtaining first primary channel information of a basic service set (BSS) with which the terminal is associated; performing clear channel assessment (CCA) for at least one secondary channel of the BSS; and when at least one idle secondary channel which can be associated with the primary channel is present as a result of performing the CCA, transmitting the data through a wideband channel in which the primary channel and the idle secondary channel are associated with each other, wherein a transmission opportunity (TXOP) of the data which is transmitted through the associated wideband channel is adjusted based on a bandwidth of the wideband channel.

Still yet another exemplary embodiment of the present invention provides a wireless communication terminal including: a transceiver transmitting and receiving a radio signal; and a processor controlling an operation of the terminal, wherein the processor obtains first primary channel information of a basic service set (BSS) with which the terminal is associated, performs clear channel assessment (CCA) for at least one secondary channel of the BSS, and when at least one idle secondary channel which may be associated with the primary channel is present as a result of performing the CCA, transmits the data through a wideband channel in which the primary channel and the idle secondary channel are associated with each other, wherein a transmission opportunity (TXOP) of the data which is transmitted through the associated wideband channel is adjusted based on a bandwidth of the wideband channel.

In this case, as the bandwidth of the wideband channel is larger, the adjusted TXOP may be set to be a smaller value.

Still yet another exemplary embodiment of the present invention provides a wireless communication method of a terminal, including: obtaining first primary channel information of a basic service set (BSS) with which the terminal is associated; obtaining secondary channel information forming a wideband channel together with the primary channel for data transmission of the terminal; allocating a backoff counter for performing a backoff procedure for the primary channel; and performing the backoff procedure for the primary channel by using the allocated backoff counter, wherein the backoff counter is allocated based on a bandwidth of the wideband channel.

Still yet another exemplary embodiment of the present invention provides a wireless communication terminal including: a transceiver transmitting and receiving a radio signal; and a processor controlling an operation of the terminal, wherein the processor obtains first primary channel information of a basic service set (BSS) with which the terminal is associated, obtains secondary channel information forming a wideband channel together with the primary channel for data transmission of the terminal, allocates a backoff counter for performing a backoff procedure for the primary channel, and performs the backoff procedure for the primary channel by using the allocated backoff counter, wherein the backoff counter is allocated based on a bandwidth of the wideband channel.

According to an exemplary embodiment, as the bandwidth of the wideband channel is larger, at least one of a minimum value and a maximum value of a contention window for allocating the backoff counter may be increased.

According to another exemplary embodiment, when the terminal transmits the data by using the wideband channel, the terminal may extract a plurality of backoff counter candidate values within the set contention window range and allocate the largest value among the extracted backoff counter candidate values to the backoff counter.

Advantageous Effects

According to exemplary embodiments of the present invention, an environment in which a terminal can use a wideband channel is provided by various methods to increase a data transmission speed of the terminal.

According to the exemplary embodiments of the present invention, a bandwidth is extended by using a separately allocated alternative primary channel in addition to a primary channel allocated to a BSS in the related art to increase the overall channel use rate.

According to the exemplary embodiments of the present invention, when the terminal transmits data by using the wideband channel, fairness of a data transmission opportunity with terminals of another BSS can be maintained.

According to the exemplary embodiments of the present invention, the total resource use rate can be increased in a contention based channel access system and performance of a wireless LAN system can be improved.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0063356, 10-2014-0063359 and 10-2014-0148477 filed in the Korean Intellectual Property Office and the embodiments and mentioned items described in the respective applications are included in the Detailed Description of the present application.

Figure 1:
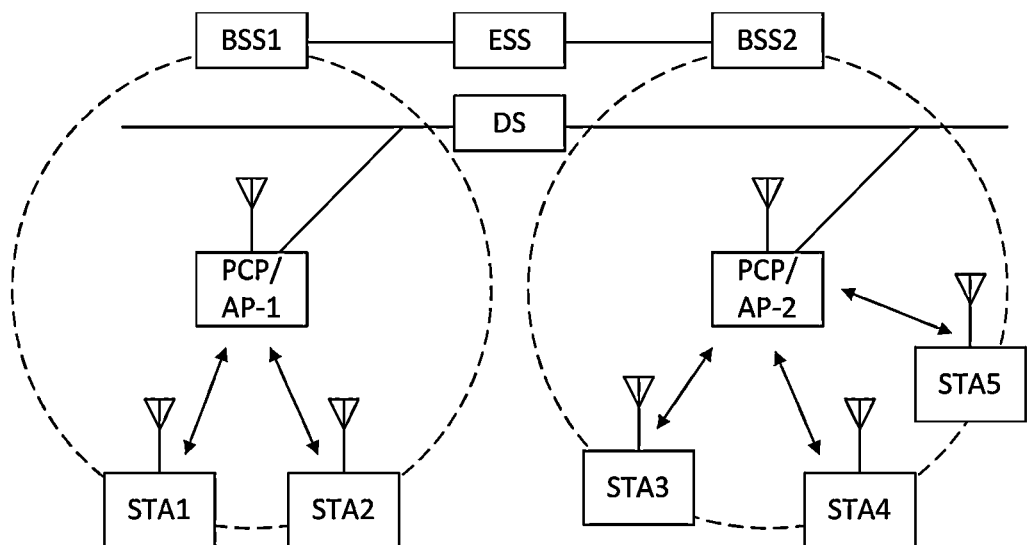
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, as a concept including all wireless LAN communication devices such as the station and the AP, a term 'terminal' may be used. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
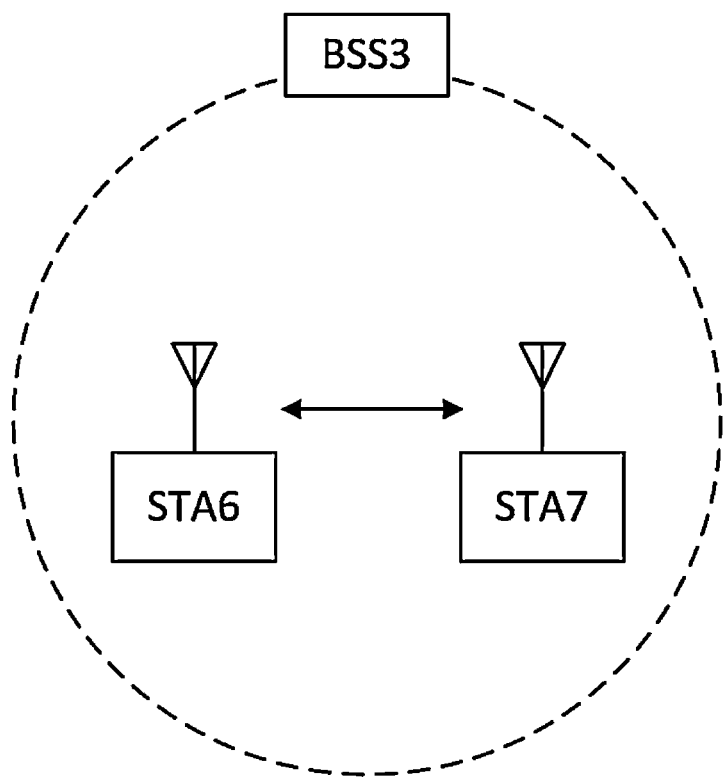
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
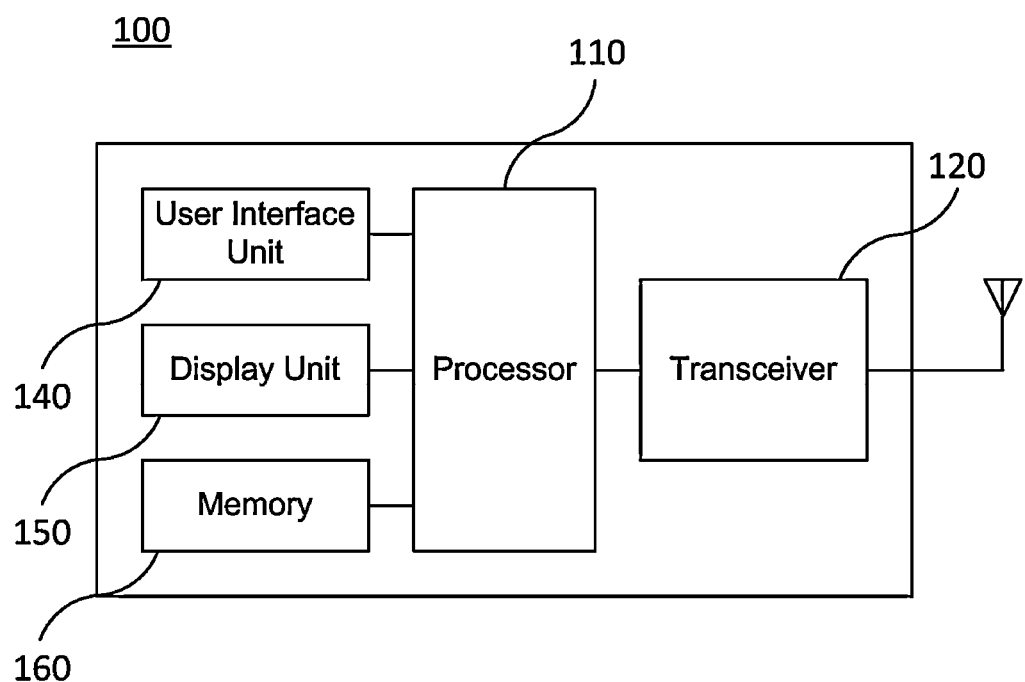
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
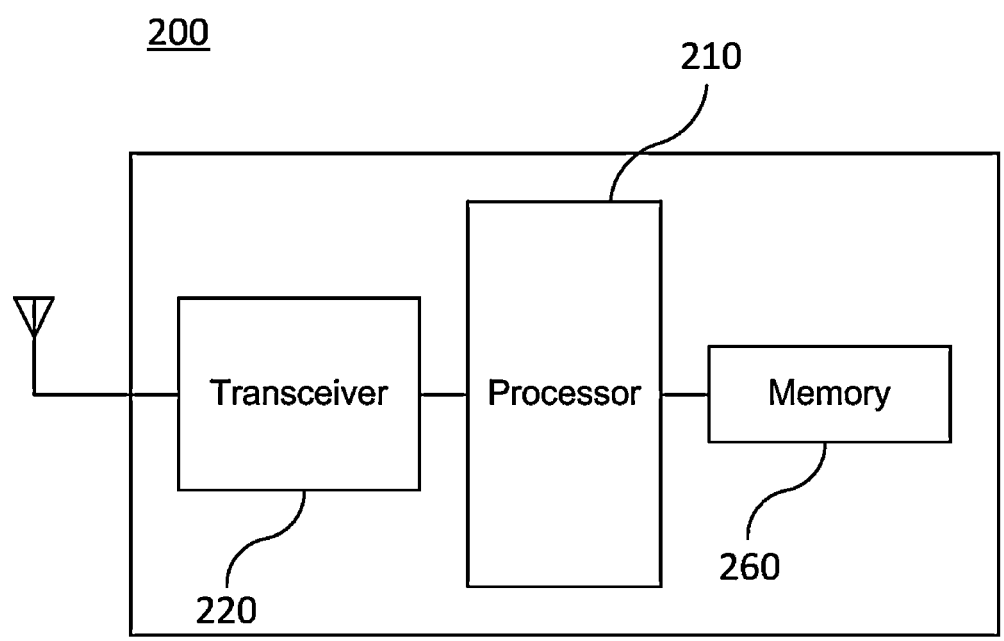
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
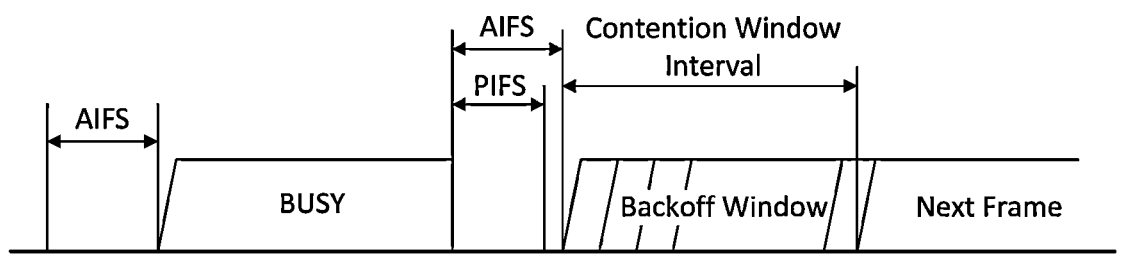
FIG. 5 is a diagram schematically illustrating a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
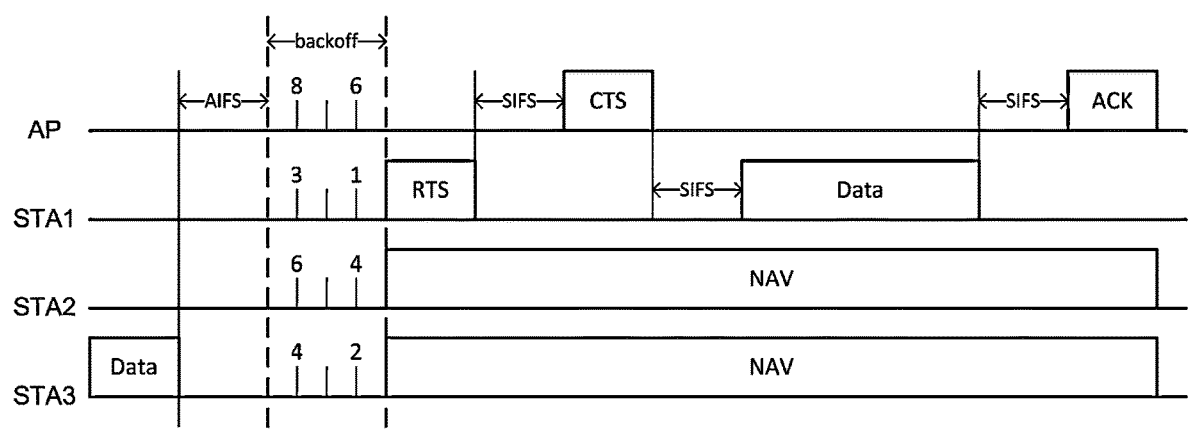
FIG. 6 is a diagram illustrating a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a radio signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a radio signal having the CCA threshold or more, which is received by the terminal, indicates the corresponding terminal as a receiver, the terminal processes the received radio signal. Meanwhile, when a radio signal is not sensed in the corresponding channel or a radio signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number allocated to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are allocated with new random numbers, respectively to perform the backoff procedure again. According to an embodiment, a random number newly allocated to each terminal may be decided within a range (2*CW) which is twice larger than a range (a contention window, CW) of a random number which the corresponding terminal is previously allocated with. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
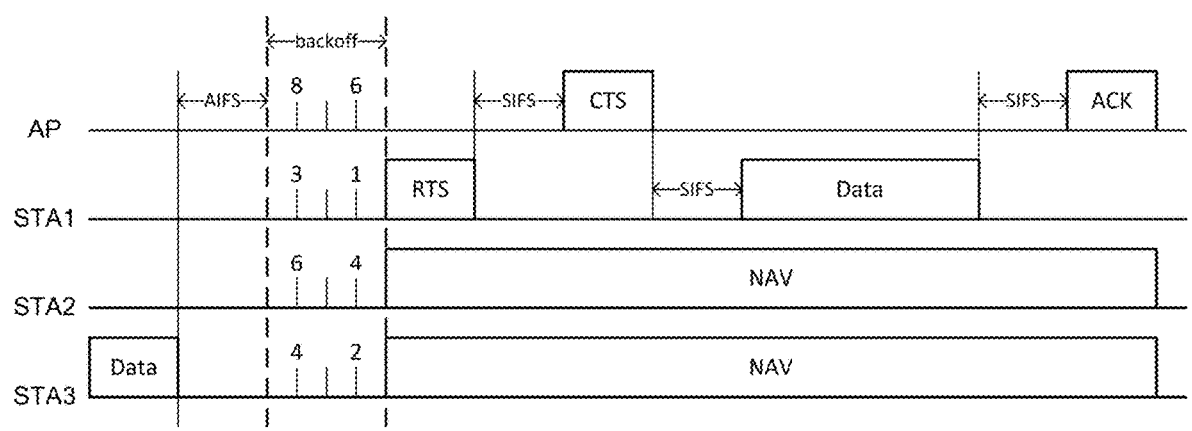
FIG. 7 is a diagram illustrating a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter is expired transmits the request to send (RTS) frame to notify that corresponding terminal has data to transmit. According to an exemplary embodiment of FIG. 7, STA1 which holds a lead in contention with minimum backoff may transmit the RTS frame after the backoff counter is expired. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Figure 8:
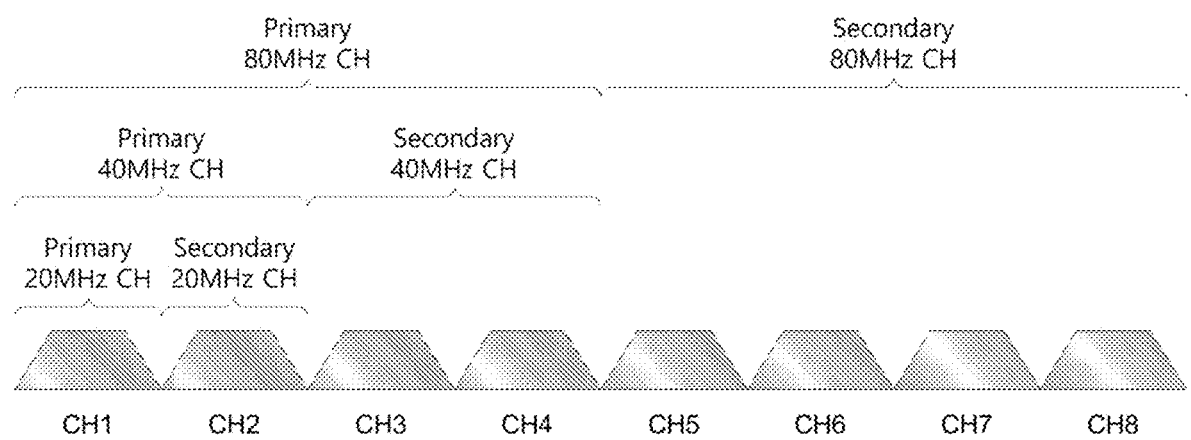
FIG. 8 is a diagram illustrating a wideband allocation method for wireless LAN communication.

FIG. 8 illustrates a wideband allocation method for wireless LAN communication. In FIG. 8 and drawings given below, CH1 to CH8 represent 20 MHz channels, respectively, but the number of channels and a bandwidth of the channels may be changed according to a communication scheme to which the present invention is applied.

In the wireless LAN system, the terminals of each BSS perform communication by setting a specific channel as a primary channel. The primary channel is a channel used for non-AP STAs to be associated with the AP and may be extended to 40 MHz, 80 MHz, and the like from basic 20 MHz according to a transmission bandwidth. Meanwhile, a secondary channel is an adjacent channel having the same bandwidth as the primary channel and forms a channel having a double bandwidth in association with the primary channel.

The terminals of the BSS perform clear channel assessment (CCA) with respect to each channel to check whether the corresponding channel is busy and perform bandwidth extension based on channel(s) determined to be idle. That is, by using 20 MHz as a basic bandwidth, the terminal may extend the transmission bandwidth to 40 MHz, 80 MHz, and 160 MHz by considering whether channels adjacent to the primary channel are idle.

In more detail, referring to FIG. 8, CH1 may be set as a primary 20 MHz channel of the BSS and a total 40 MHz transmission bandwidth having CH1 and CH2 as the primary channel and the secondary channel, respectively may be used when CH2 adjacent to CH1 is idle. Further, when both CH3 and CH4 adjacent to CH1 and CH2 are idle, a total 80 MHz transmission bandwidth having CH1 and CH2 as a primary 40 MHz channel and having CH3 and CH4 as a secondary 40 MHz channel may be used. Similarly, when all of CH5 to CH8 adjacent to CH1 to CH4 are idle, a total 160 MHz transmission bandwidth having CH1 to CH4 as a primary 80 MHz channel and having CH5 to CH8 as a secondary 80 MHz channel may be used.

Figure 9:
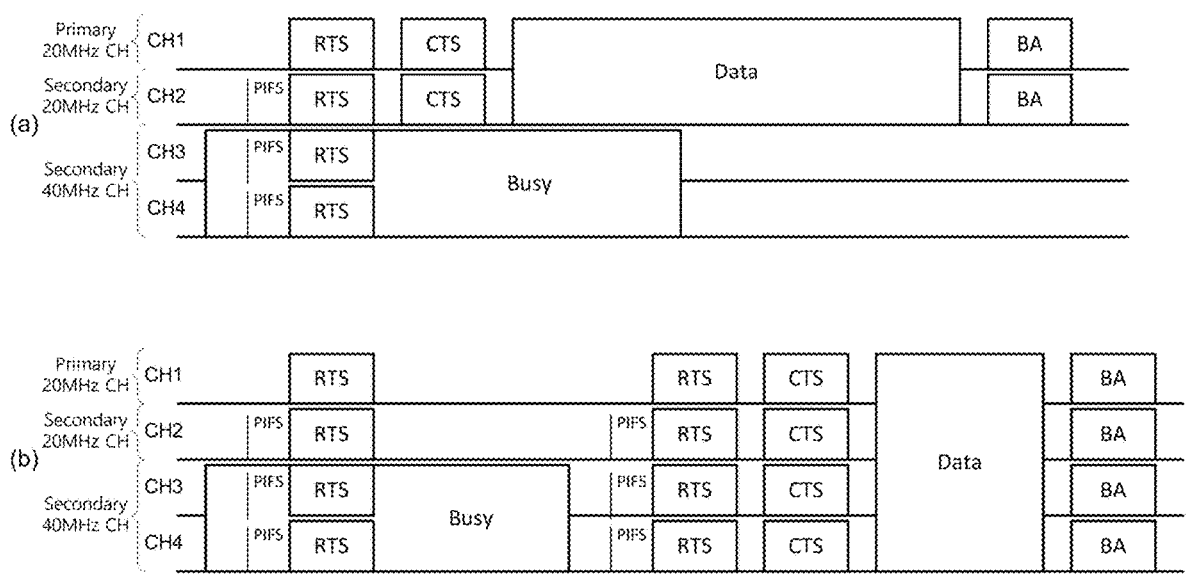
FIG. 9 is a diagram illustrating an exemplary embodiment of a wideband access method of a terminal.

FIG. 9 illustrates a wideband access method of a terminal using a request to send (RTS) frame and a clear to send (CTS) frame. In the exemplary embodiment of FIG. 9, a maximum bandwidth is set to 80 MHz in the corresponding BSS. Further, as described above in FIG. 7, the terminal performs a backoff procedure for the primary channel (CH1) and when a backoff counter is expired the terminal transmits RTS frames to channels (CH1 to CH4) of 80 MHz bandwidth, which include the primary channel and the secondary channels.

First, FIG. 9(a) illustrates a wideband access method according to a dynamic bandwidth operation. Referring to FIG. 9(a), the terminal transmits the RTS frames to each of the channels CH1 to CH4 of 80 MHz bandwidth, but CTS frames are received only in CH1 and CH2 since secondary 40 MHz channels CH3 and CH4 are busy. Therefore, the terminal transmits data by using a partial bandwidth of 40 MHz as the transmission bandwidth. In this case, the transmission bandwidth has CH1 and CH2 in which the CTS frame is received as the primary channel and the secondary channel, respectively. Meanwhile, the corresponding terminal may not use CH3 and CH4 in which the CTS frame is not received until a next backoff procedure for the primary channel CH1 is performed. That is, according to the exemplary embodiment of FIG. 9(a), the terminal transmits data by using the maximum bandwidth when the primary channel and all secondary channels are idle. Further, the terminal transmits data by using only a partial bandwidth including the primary channel when at least some of secondary channels are busy.

Next, FIG. 9(b) illustrates a wideband access method according to a static bandwidth operation. Referring to FIG. 9(b), the terminal transmits the RTS frames to each of the channels CH1 to CH4 of 80 MHz bandwidth, but CTS frames are not received through some channels CH3 and CH4 since the CH3 and CH4 are busy. Accordingly, the terminal postpones using all channels CH1 to CH4 of 80 MHz bandwidth and transmits the RTS frames for four channels again after the next backoff procedure. That is, according to the exemplary embodiment of FIG. 9(b), when at least one channel among all channels of the maximum bandwidth is busy, the terminal does not use the total bandwidth and performs a backoff procedure again for the primary channel in order to transmit data.

Figure 10:
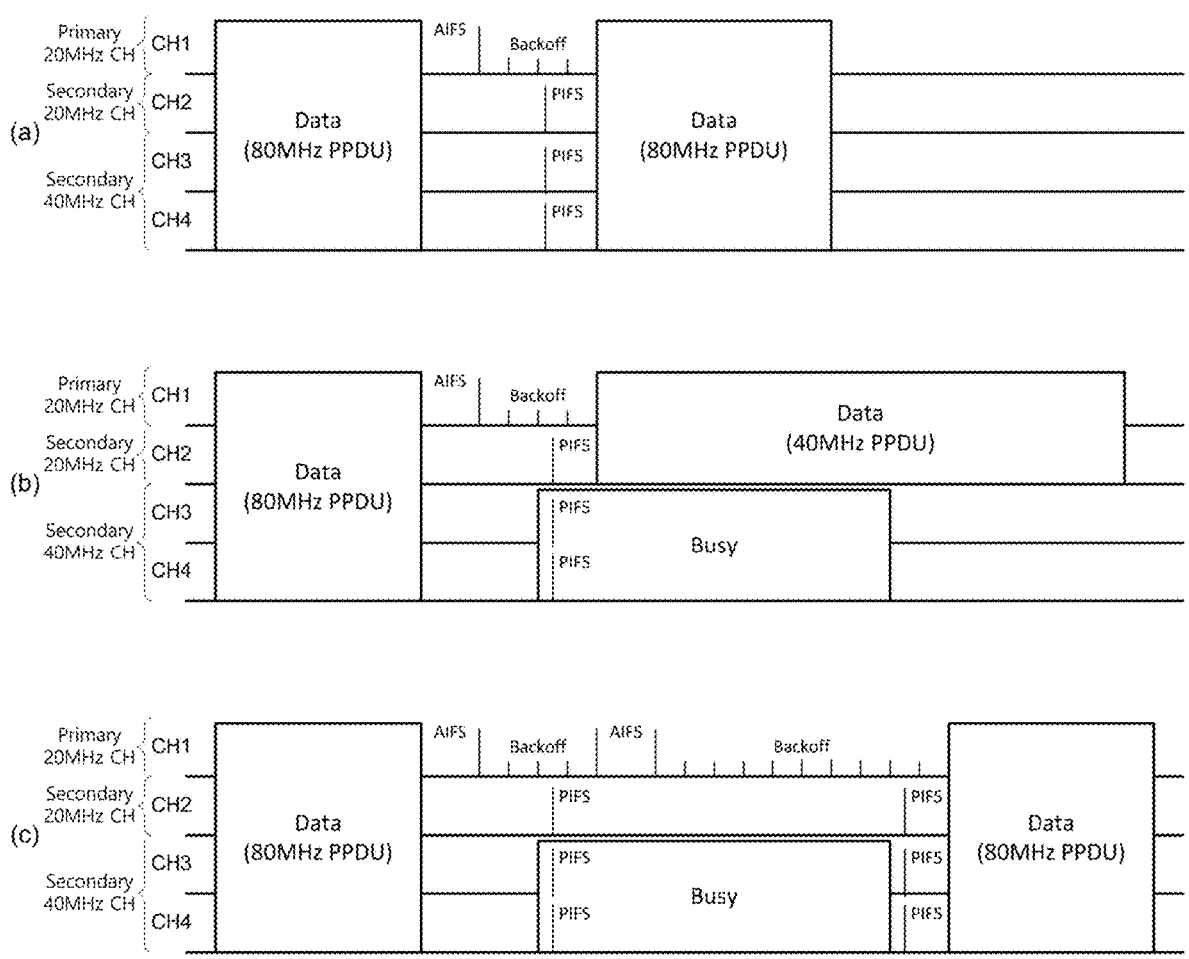
FIG. 10 is a diagram illustrating another exemplary embodiment of a wideband access method of a terminal.

FIG. 10 illustrates another exemplary embodiment of a wideband access method of a terminal. Even in the exemplary embodiment of FIG. 10, the maximum bandwidth is set to 80 MHz in the corresponding BSS and duplicated description with the exemplary embodiment of FIG. 9 will be omitted.

FIG. 10(a) illustrates an exemplary embodiment in which data is successfully transmitted by using the set maximum bandwidth, and FIGS. 10(b) and 10(c) illustrate exemplary embodiments of data transmission in which some channels of the maximum bandwidth are busy. In more detail, FIG. 10(b) illustrates the wideband access method according to the dynamic bandwidth operation and when the secondary 40 MHz channels CH3 and CH4 are busy, the terminal transmits data by using only the primary 40 MHz channels CH1 and CH2. Next, FIG. 10(c) illustrates the wideband access method according to the static bandwidth operation and when at least some channels are busy, the terminal does not transmit data and defers by performing a backoff procedure until the maximum bandwidth of 80 MHz is totally usable.

Meanwhile, in each exemplary embodiment of FIG. 10, the backoff procedure and enhanced distributed coordination access (EDCA) are performed only in the primary 20 MHz channel CH1 and in other secondary channels CH2 to CH4, it may be verified whether the corresponding channel is usable through CCA for a PIFS time before the backoff counter is expired.

Figure 11:
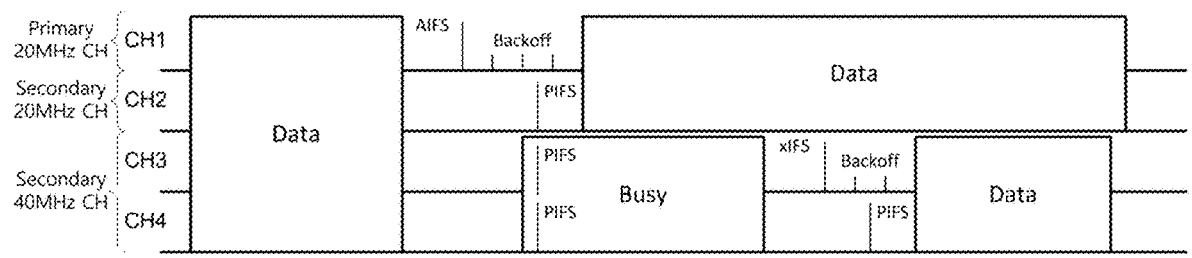
FIG. 11 is a diagram illustrating yet another exemplary embodiment of a wideband access method of a terminal.

FIG. 11 illustrates yet another exemplary embodiment of a wideband access method of a terminal. In the previous exemplary embodiments, the terminal that transmits the data uses initially set channel(s) until the corresponding transmission ends, but in the exemplary embodiment of FIG. 11, when a channel which is additionally usable is sensed while transmitting the data, the terminal may use the corresponding channel.

In more detail, the terminal performs a backoff procedure for the primary channel CH1 and verifies, in other secondary channels CH2 to CH4, whether each channel is usable by performing CCA for the PIFS time before the backoff counter of the backoff procedure is expired. As described in the exemplary embodiment of FIG. 11, when some secondary channels CH3 and CH4 are busy, the terminal performs data transmission by using only the channels CH1 and CH2 of a partial bandwidth, that is, 40 MHz bandwidth, which include the primary channel CH1. However, when the channels CH3 and CH4 which have been impossible to use at a wideband access time become idle and thereby usable while transmitting the data, the terminal may perform additional channel access to the corresponding channels.

According to the exemplary embodiment of the present invention, the terminal may set at least one channel among the secondary channels which are usable (i.e., idle) as an alternative primary channel (APCH). Furthermore, the terminal may perform an additional channel access by using the set alternative primary channel. In the exemplary embodiment of the present invention, the alternative primary channel (APCH) is a primary channel set in addition to the basic primary channel (i.e., primary 20 MHz channel) of the corresponding BSS. The alternative primary channel may operate as a primary channel for at least one channel among secondary channels which are not associated with the basic primary channel. That is, in the aforementioned exemplary embodiment, separate bandwidth extension may be performed based on the alternative primary channel similarly to the case where the bandwidth extension for wideband data transmission is performed based on the basic primary channel. The alternative primary channel may be used for the association between the non-AP STA and the AP similarly to the basic primary channel and the backoff procedure, the enhanced distributed coordination access (EDCA), and the like may be performed. In the same BSS, the basic primary channel is set identically for each terminal, but the alternative primary channel may be set independently for each terminal. Accordingly, an alternative primary channel set in some terminals may be different from an alternative primary channel set in other terminals in the same BSS. The non-AP STA may set a new link with the AP by using the alternative primary channel and transmit data through the set link. Meanwhile, in the exemplary embodiment of the present invention, it is described that the basic primary channel is an original primary channel set in the corresponding BSS and has a bandwidth of 20 MHz, but the present invention is not limited thereto and the basic primary channel may be set with another bandwidth in some exemplary embodiments.

FIG. 11 illustrates an exemplary embodiment in which CH3 between the usable secondary channels CH3 and CH4 is set as the alternative primary channel. When the alternative primary channel CH3 becomes idle, the terminal performs a backoff procedure for CH3 after an xIFS time. The xIFS in which the terminal waits before the backoff procedure of the alternative primary channel starts may become the aforementioned AIFS or PIFS and the present invention is not limited thereto. Meanwhile, for the PIFS time before the backoff counter for the alternative primary channel CH3 is expired, the terminal performs CCA for another secondary channel CH4 which can be associated with the alternative primary channel CH3 to verify whether the corresponding channel is usable. When the alternative primary channel CH3 is maintained to be idle and the backoff counter for the corresponding channel is thus expired, the terminal transmits data by using the alternative primary channel CH3. In this case, when the secondary channel CH4 which can be associated with the alternative primary channel CH3 is present by maintaining the idle state for the PIFS time before the backoff counter is expired, the terminal transmits data by using a wideband channel in which the alternative primary channel CH3 and the corresponding secondary channel CH4 are associated with each other.

FIGS. 12 to 15 illustrate methods for setting an alternative primary channel according to an exemplary embodiment of the present invention.

In the exemplary embodiments of FIGS. 12 to 15, a channel marked with a shade represents a channel which is busy. In the exemplary embodiment of the present invention, the busy channel includes a channel used for transmitting data by the corresponding terminal and a channel used for transmitting data by another terminal. Herein, the channel used for transmitting data by another terminal may be determined based on a CCA result of the corresponding channel and include a channel used for transmitting data by another terminal in the same BSS and a channel in which interference occurs due to a transmission signal of a terminal in another BSS. The terminal obtains basic primary channel information of the BSS with which the corresponding terminal is associated and performs CCA with respect to the basic primary channel and secondary channels. In addition, the terminal may set the alternative primary channel among one or more secondary channels determined to be idle as a result of performing the CCA.

Figure 12:
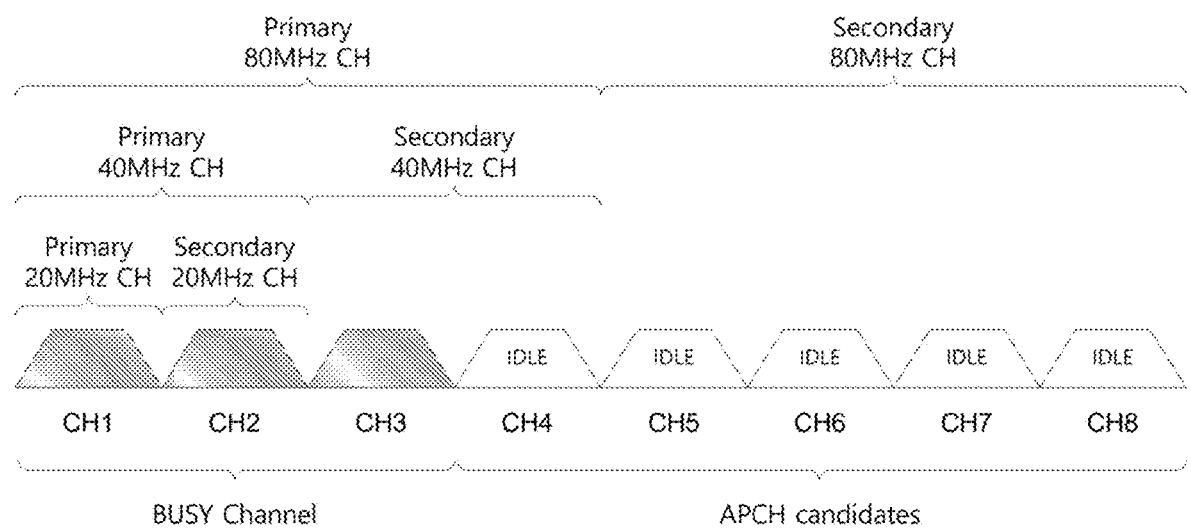
FIGS. 12 to 15 are diagrams illustrating methods for setting an alternative primary channel according to an exemplary embodiment of the present invention.

First, FIG. 12 illustrates a method for setting an alternative primary channel according to an exemplary embodiment of the present invention. In the exemplary embodiment of FIG. 12, CH1 is set as the basic primary channel (i.e., primary 20 MHz channel), and CH1 to CH3 are busy, and CH4 to CH8 are idle.

According to the exemplary embodiment of FIG. 12, the alternative primary channel may be randomly set among usable idle secondary channels. That is, all idle secondary channels may become candidates of the alternative primary channel and the respective secondary channels may be selected as the alternative primary channel with a uniform probability distribution. In the exemplary embodiment of FIG. 12, 5 idle secondary channels of CH4 to CH8 are present, and therefore, each secondary channel may be selected as the alternative primary channel with a probability of 1/5. Meanwhile, according to an additional exemplary embodiment of the present invention, a weighted value of selecting the alternative primary channel for each secondary channel may be granted according to a channel situation, a traffic characteristic, and the like.

Figure 13:
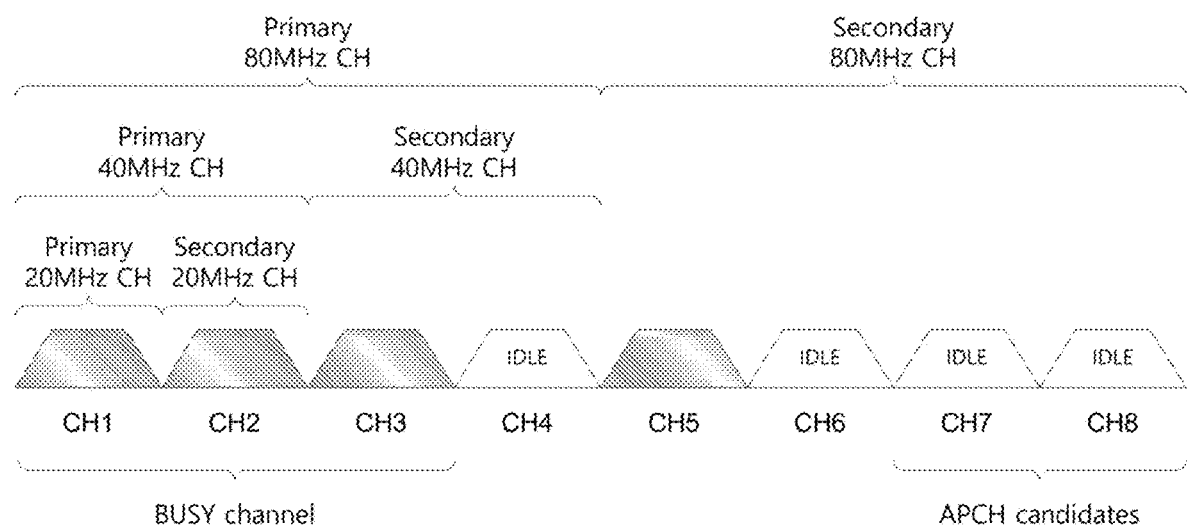

FIG. 13 illustrates a method for setting an alternative primary channel according to another exemplary embodiment of the present invention. In the exemplary embodiment of FIG. 13, CH1 is set as the basic primary channel, and CH1 to CH3 and CH5 are busy, and CH4 and CH6 to CH8 are idle.

According to the exemplary embodiment of FIG. 13, a channel, among the usable idle secondary channels, which may form a channel having the largest bandwidth in association with other secondary channel(s) may be set as the alternative primary channel. In FIG. 13, since CH3 adjacent to CH4 is busy, a formable bandwidth of CH4 becomes a maximum of 20 MHz. Similarly, since CH5 adjacent to CH6 is busy, a formable bandwidth of CH6 becomes a maximum of 20 MHz. However, since channels CH8 and CH7 adjacent to CH7 and CH8, respectively are idle, CH7 and CH8 may form channels having the larger bandwidth in association with the adjacent channels and the formable bandwidths of CH7 and CH8 become a maximum of 40 MHz. Therefore, according to the exemplary embodiment of FIG. 13, CH7 and CH8 having the largest formable bandwidth may become the candidates of the alternative primary channel.

The terminal may set one of a plurality of secondary channels which may form the channel having the largest bandwidth as the alternative primary channel. According to an exemplary embodiment, the terminal may randomly set the alternative primary channel among the plurality of secondary channels which may form the channel having the largest bandwidth by combining the exemplary embodiments of FIGS. 12 and 13. That is, in FIG. 13, CH7 and CH8 may become the candidates of the alternative primary channel and each secondary channel may be selected as the alternative primary channel with the probability of 1/2.

Figure 14:
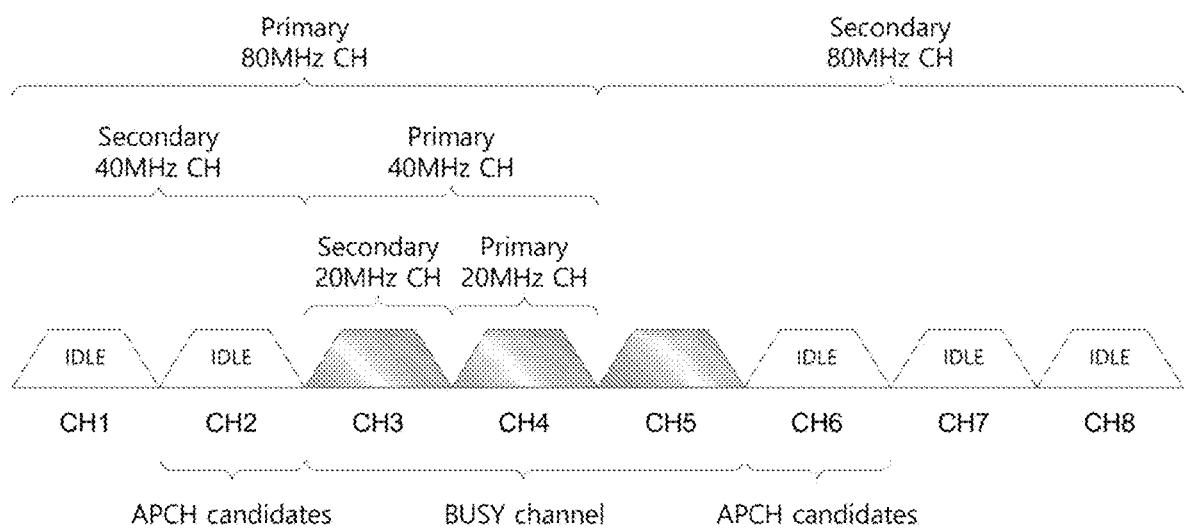
Figure 15:
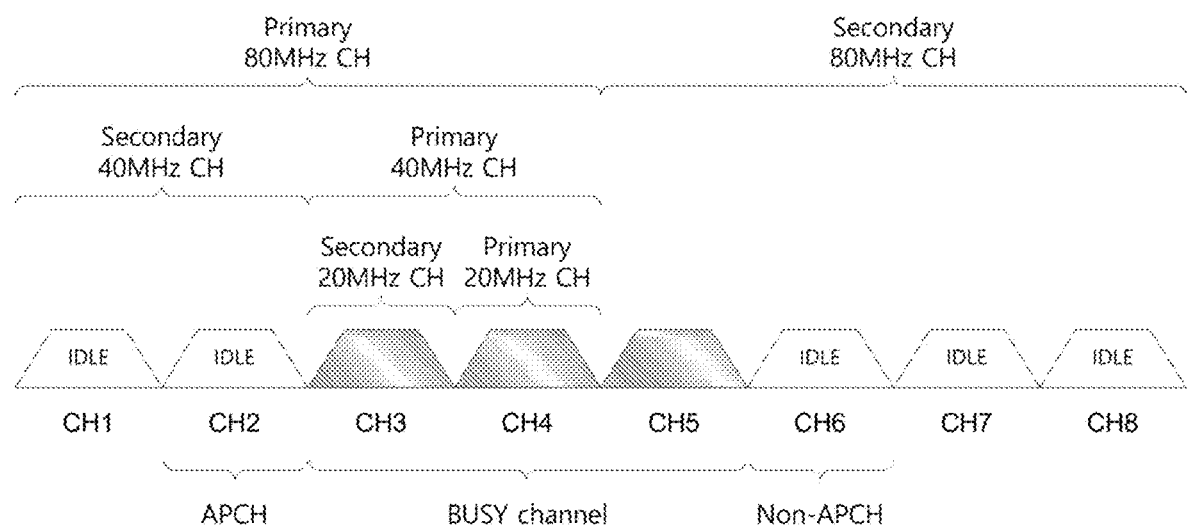

FIGS. 14 and 15 illustrate methods for setting an alternative primary channel according to yet another exemplary embodiment of the present invention. In the exemplary embodiment of FIGS. 14 and 15, CH4 is set as the basic primary channel, and CH3 to CH5 are busy, and CH1, CH2 and CH6 to CH8 are idle.

According to the exemplary embodiment of the present invention, the alternative primary channel may be selected based on a frequency interval between the corresponding secondary channel and the basic primary channel among the usable idle secondary channels. FIGS. 14 and 15 illustrate an exemplary embodiment in which a secondary channel having the smallest frequency interval from the basic primary channel, that is, most adjacent to the basic primary channel is selected as the alternative primary channel. In this case, a method that selects the adjacent channel includes a method based on a physical frequency interval and a method based on a logical frequency interval.

First, FIG. 14 illustrates an exemplary embodiment of selecting the alternative primary channel based on the physical frequency interval. The method based on the physical frequency interval means selecting the alternative primary channel by considering only an actual frequency interval. Referring to FIG. 14, CH2 and CH6 which are most adjacent to the basic primary channel CH4, among the idle secondary channels may become the candidates of the alternative primary channel. The terminal may randomly set the alternative primary channel between the alternative primary channel candidates CH2 and CH6.

On the contrary, FIG. 15 illustrates an exemplary embodiment of selecting the alternative primary channel based on the logical frequency interval. The logical frequency interval may be determined according to a merging or association order with the primary channel according to the aforementioned wideband allocation rule. Referring to FIG. 15, CH1 and CH2 having the highest order of association with the basic primary channel CH4 may become the candidates of the alternative primary channel in order to form the wideband channel among the idle secondary channels. According to an exemplary embodiment, the terminal may randomly set the alternative primary channel between the alternative primary channel candidates CH1 and CH2. According to another exemplary embodiment, the terminal may set the alternative primary channel by using both the logical frequency interval and the physical frequency interval. That is, CH2 having the smallest physical frequency interval from the basic primary channel CH4, between CH1 and CH2 having the smallest logical frequency interval from CH4 may be set as the alternative primary channel. Meanwhile, in the exemplary embodiment of FIG. 15, CH6 has the same physical frequency interval from the basic primary channel as CH2, but since CH6 has the larger logical frequency interval from the basic primary channel than CH2, and as a result, CH6 is not selected as the alternative primary channel.

According to an additional exemplary embodiment of the present invention, a channel having the lowest signal strength according to a result of performing CCA for each secondary channel may be set as the alternative primary channel. In this case, a channel having small interference and noise is set as the alternative primary channel to increase reliability and efficiency of the data transmission.

The aforementioned methods for setting alternative primary channel describe exemplary embodiments of the present invention and the alternative primary channel may be set by combining or modifying the aforementioned exemplary embodiments. For example, the alternative primary channel may be selected even by a method opposite to the exemplary embodiments of FIGS. 14 and 15. In other words, the secondary channel (e.g., CH8) having the largest physical frequency interval or logical frequency interval from the basic primary channel may be set as the alternative primary channel. Further, in the exemplary embodiment of FIG. 13, among channels which may form the channel having the largest bandwidth in association with other secondary channel(s), a channel (e.g., CH7) having the smallest physical frequency interval or logical frequency interval from the basic primary channel may be selected as the alternative primary channel.

FIGS. 16 to 23 illustrate various methods for operating an alternate primary channel according to an exemplary embodiment of the present invention. In the respective exemplary embodiments of FIGS. 16 to 23, duplicated description of parts which are the same as or correspond to the exemplary embodiment of the previous drawing will be omitted.

In the exemplary embodiment of FIGS. 16 to 23, it is assumed that CH1 is set as the basic primary channel (i.e., primary 20 MHz channel) and CH8 is set as the alternative primary channel. Each terminal in the BSS obtains basic primary channel information and the alternative primary channel information and attempts bandwidth extension to secondary channels adjacent to the basic primary channel and the alternative primary channel, respectively. The terminal may transmit data through the channels of the secured bandwidth. In the exemplary embodiment of the present invention, 'data' is used as a term including concepts of a data frame, a PLCP protocol data unit (PPDU), a MAC protocol data unit (MPDU), an aggregate MPDU (A-MPDU), and the like according to the implementation. Further, in the exemplary embodiment of the present invention, a 'basic channel group' indicates the basic primary channel itself or a channel having an extended bandwidth, which includes the basic primary channel. In addition, an 'alternative channel group' is used as a term that indicates the alternative primary channel itself or a channel having an extended bandwidth, which includes the alternative primary channel.

Figure 16:
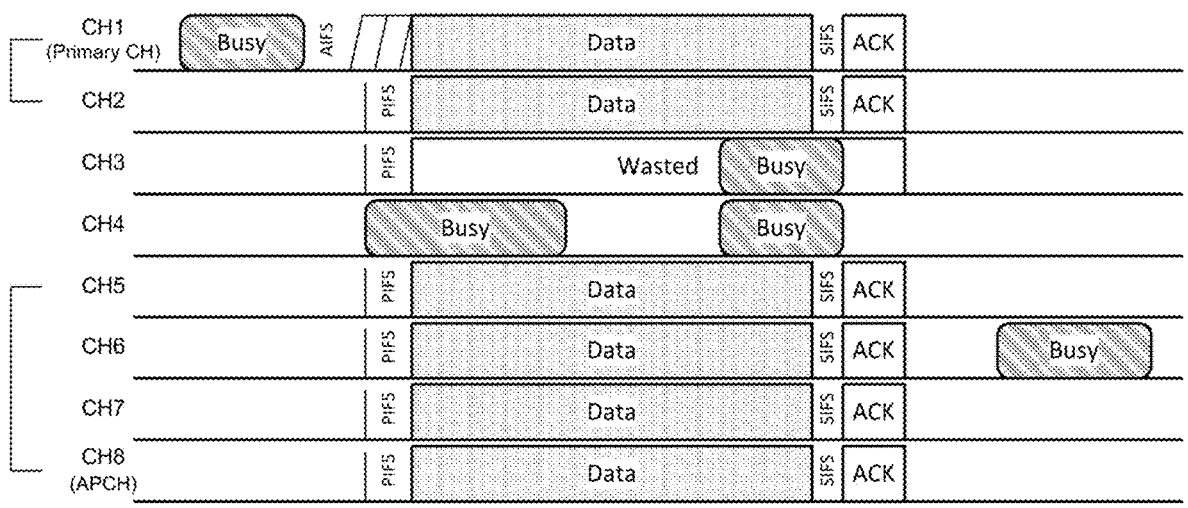
FIGS. 16 to 23 are diagrams illustrating various methods for operating an alternative primary channel according to an exemplary embodiment of the present invention.

FIG. 16 illustrates an exemplary embodiment of a PIFS sensing based alternative primary channel operation method. According to the exemplary embodiment of FIG. 16, the terminal performs a backoff procedure for the basic primary channel CH1 in order to transmit data and performs CCA for the alternative primary channel CH8 for a PIFS time before the backoff counter of the backoff procedure is expired to verify whether the corresponding channel is usable. In this case, for the PIFS time before the backoff counter is expired, the terminal may perform CCA even with respect to other secondary channels CH2 to CH7 in addition to the alternative primary channel CH8.

When the basic primary channel CH1 is maintained to be idle and the backoff counter for the corresponding channel is thus expired, the terminal transmits data through the basic channel group including the basic primary channel CH1. In order to set the basic channel group, the terminal performs the bandwidth extension based on the CCA result of each secondary channel performed for the PIFS time before the backoff counter for the basic primary channel is expired. Referring to FIG. 16, the secondary 20 MHz channel CH2 of the basic primary channel CH1 is idle for the PIFS time before the backoff counter for the basic primary channel CH1 is expired, but CH4 among secondary 40 MHz channels is busy. Therefore, the terminal sets CH1 and CH2 as the basic channel group and transmits data through the channel having the 40 MHz bandwidth.

According to the exemplary embodiment of the present invention, when the alternative primary channel CH8 is idle for the PIFS time, the terminal transmits the data even through the alternative channel group including the alternative primary channel CH8. In order to set the alternative channel group, the terminal performs the bandwidth extension based on the CCA result of each secondary channel performed for the PIFS time before the backoff counter for the basic primary channel is expired. That is, when secondary channel(s) which can be associated with the alternative primary channel CH8 is present by maintaining the idle state for the PIFS time before the backoff counter is expired, the terminal transmits data by using the wideband channel in which the alternative primary channel CH8 and the corresponding secondary channel(s) are associated with each other. Referring to FIG. 16, the secondary 20 MHz channel CH7 of the alternative primary channel CH8 and the secondary 40 MHz channels CH5 and CH6 are all idle for the PIFS time. Therefore, the terminal sets CH5 to CH8 as the alternative channel group to transmit the data through the channel having the 80 MHz bandwidth.

Meanwhile, according to another exemplary embodiment of the present invention, the terminal may perform a separate backoff procedure for the alternative primary channel to determine whether the corresponding channel is usable. In the exemplary embodiments given below, the backoff procedure for the alternative primary channel is performed to maintain fairness of channel use, while it is determined whether the alternative primary channel is usable only by the CCA for the PIFS time in the exemplary embodiment of FIG. 16.

Figure 17:
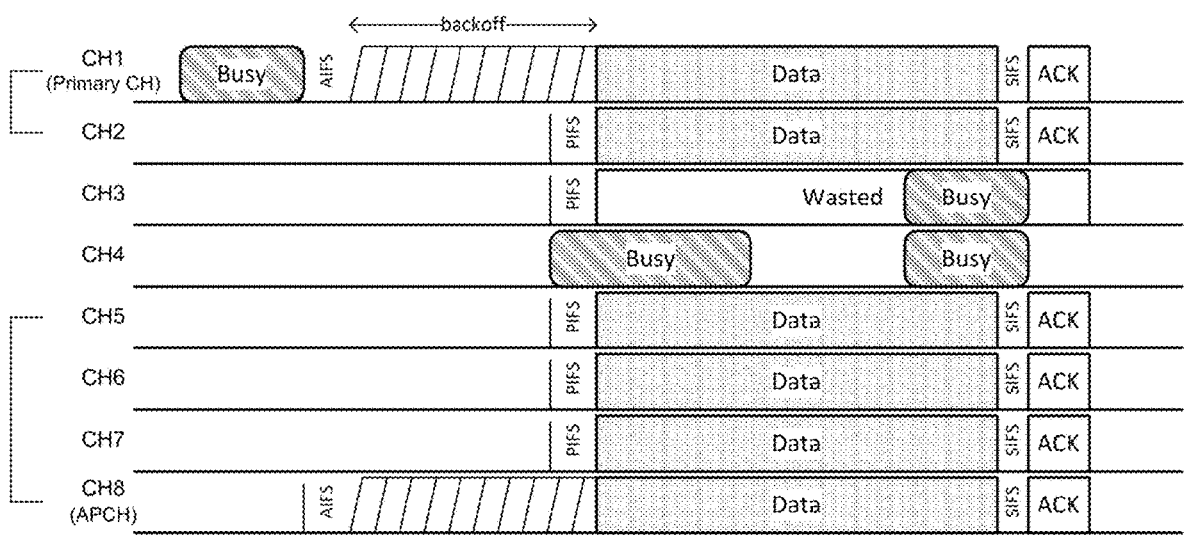
Figure 18:
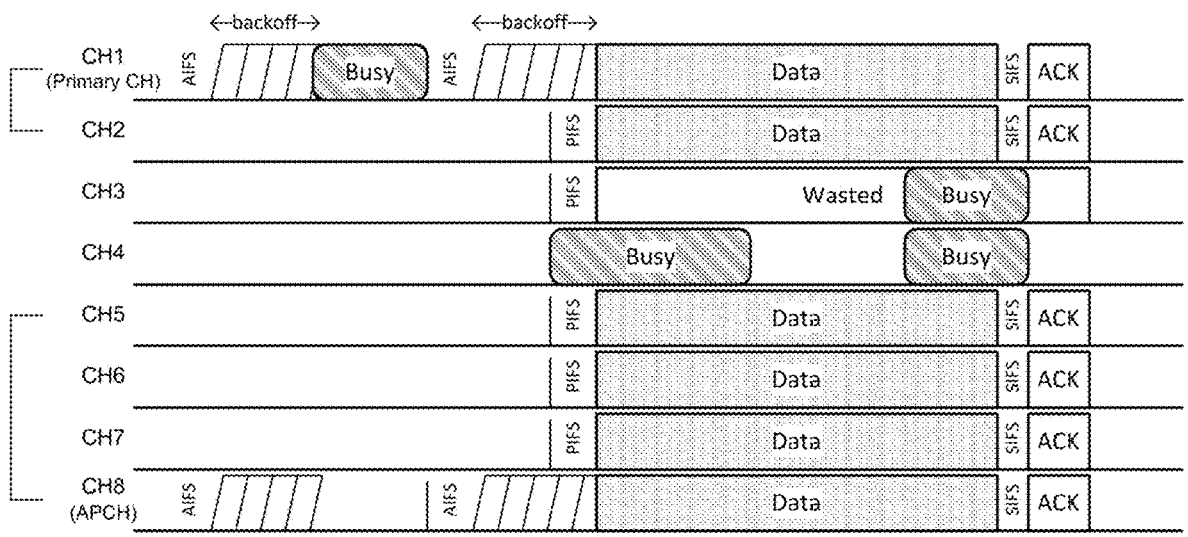
Figure 19:
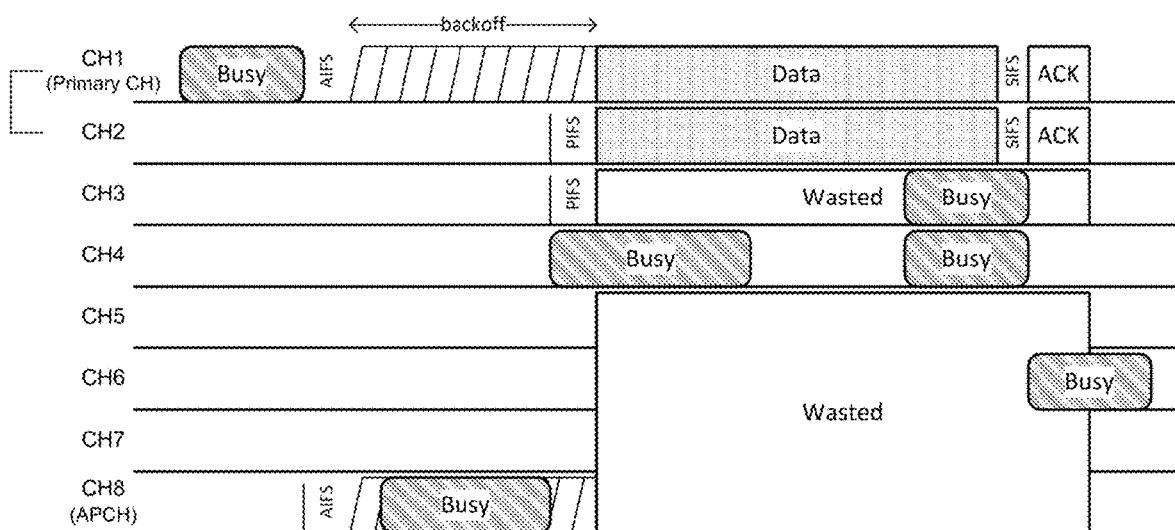

FIGS. 17 to 19 illustrate an exemplary embodiment of a common backoff based alternative primary channel operation method. That is, according to the exemplary embodiment of FIGS. 17 to 19, the backoff counter set in the basic primary channel CH1 is shared as the backoff counter for the alternative primary channel CH8. When the alternative primary channel CH8 is idle until the common backoff counter is expired, the terminal may transmit data through the alternative channel group including the alternative primary channel CH8.

FIG. 17 illustrates an exemplary embodiment in which while the backoff procedure for each of the basic primary channel CH1 and the alternative primary channel CH8 is performed, both channels are idle. When the basic primary channel CH1 and the alternative primary channel CH8 are all maintained to be idle and the backoff counter is thus expired, the terminal transmits data by using both the basic channel group and the alternative channel group. In this case, based on the CCA result for each of the secondary channels for the PIFS time before the backoff counter is expired, the terminal performs the bandwidth extension based on the basic primary channel CH1 and the bandwidth extension based on the alternative primary channel CH8. Accordingly, in the exemplary embodiment of FIG. 17, the terminal transmits the data by using the basic channel group having the 40 MHz bandwidth and the alternative channel group having the 80 MHz bandwidth.

FIG. 18 illustrates an exemplary embodiment in which while the backoff procedure for each of the basic primary channel CH1 and the alternative primary channel CH8 is performed, the basic primary channel CH1 is busy. According to the exemplary embodiment of FIG. 18, when the basic primary channel CH1 is busy, the terminal suspends the backoff procedures for the basic primary channel CH1 and the alternative primary channel CH8. When the busy state of the basic primary channel CH1 ends, the terminal resumes the backoff procedures for the basic primary channel CH1 and the alternative primary channel CH8 after an AIFS time. That is, in the exemplary embodiment of FIG. 18, the backoff procedure of the alternative primary channel CH8 is performed dependently to the backoff procedure of the basic primary channel CH1. Therefore, when the backoff procedure of the basic primary channel CH1 is suspended, the terminal also suspends the backoff procedure of the alternative primary channel CH8. In addition, when the backoff procedure of the basic primary channel CH1 is resumed, the terminal also resumes the backoff procedure of the alternative primary channel CH8. When the alternative primary channel CH8 is maintained to be idle while the backoff procedure is performed, the terminal transmits data by using both the basic channel group and the alternative channel group after the backoff counter is expired. Accordingly, in the exemplary embodiment of FIG. 18, the terminal transmits the data by using the basic channel group having the 40 MHz bandwidth and the alternative channel group having the 80 MHz bandwidth.

FIG. 19 illustrates an exemplary embodiment in which while the backoff procedure for each of the basic primary channel CH1 and the alternative primary channel CH8 is performed, the alternative primary channel CH8 is busy. Referring to FIG. 19, the backoff procedure of the alternative primary channel CH8 is performed dependently to the backoff procedure of the basic primary channel CH1, but the backoff procedure of the basic primary channel CH1 may be performed independently from the backoff procedure of the alternative primary channel CH8. That is, when the alternative primary channel CH8 is busy, the backoff procedure of the alternative primary channel CH8 is suspended, but the backoff procedure of the basic primary channel CH1 is continuously performed without suspension. As described above, when the backoff procedure of the basic primary channel CH1 is expired, the terminal may transmit the data through the basic channel group including the basic primary channel CH1. However, the data is not transmitted through the alternative primary channel CH8 in which the interference occurs during the backoff procedure. Accordingly, in the exemplary embodiment of FIG. 19, the terminal transmits the data by using the basic channel group having the 40 MHz bandwidth.

Figure 20:
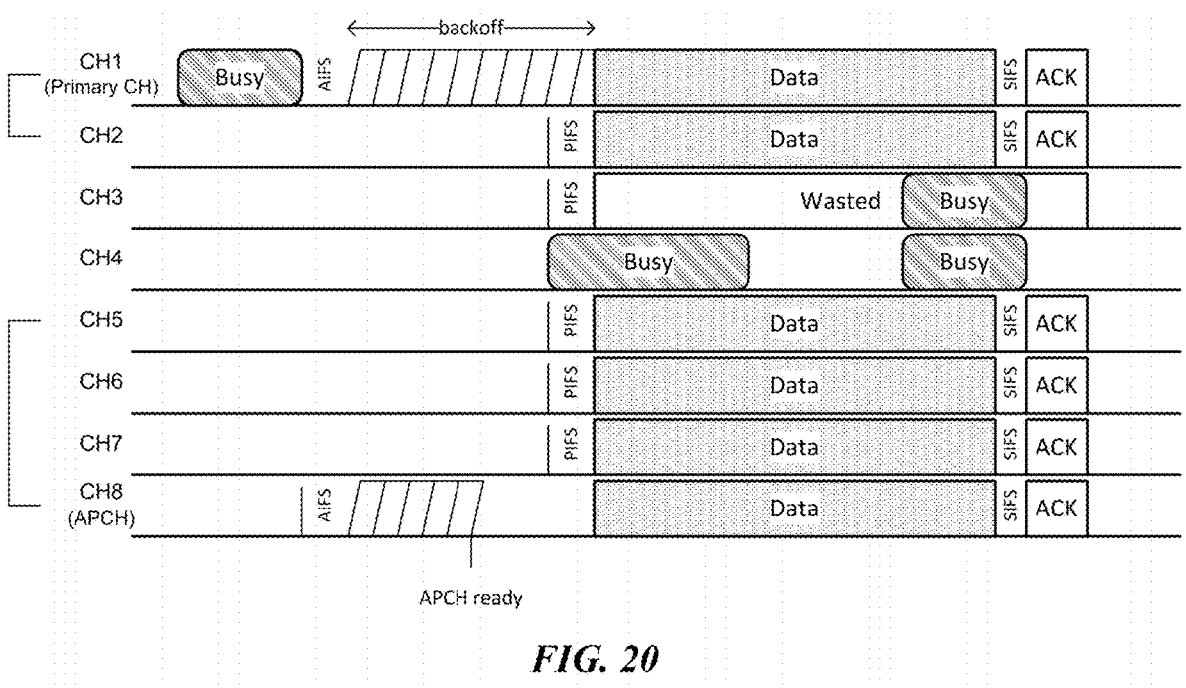
Figure 21:
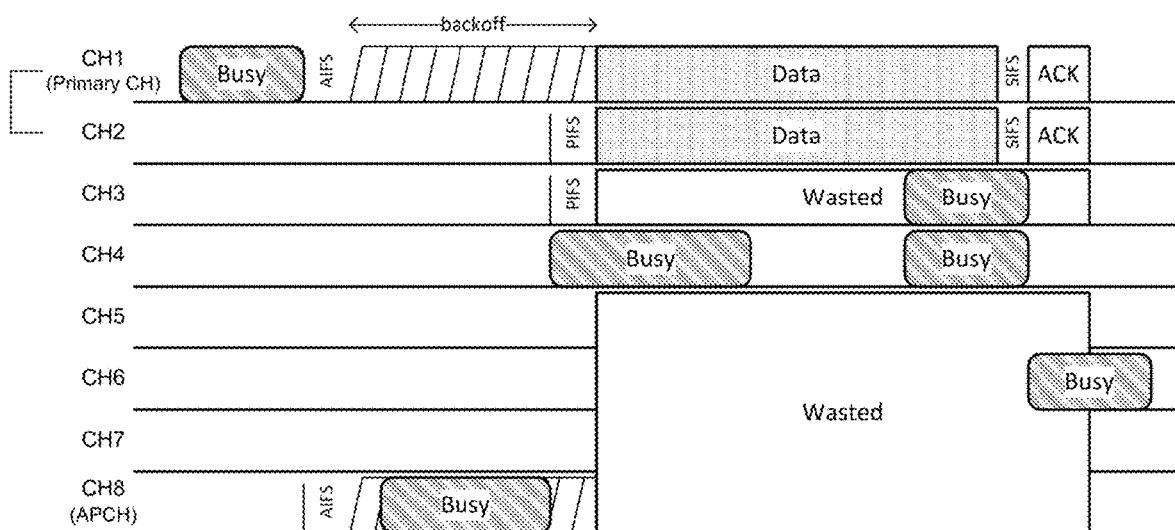

FIGS. 20 and 21 illustrate an exemplary embodiment of an independent backoff based alternative primary channel operation method. That is, according to the exemplary embodiment of FIGS. 20 and 21, the backoff counter for the basic primary channel CH1 and the backoff counter for the alternative primary channel CH8 are set independently from each other. Therefore, a backoff counter value allocated to the alternative primary channel CH8 may be larger or smaller than a backoff counter value allocated to the basic primary channel CH1.

FIG. 20 illustrates an exemplary embodiment in which the backoff counter for the alternative primary channel CH8 is expired earlier than the backoff counter for the basic primary channel CH1. When the backoff counter for the alternative primary channel CH8 is expired earlier, the terminal switches the alternative primary channel CH8 to an APCH ready state. In the APCH ready state, the terminal defers the data transmission using the alternative primary channel CH8 until the backoff counter for the basic primary channel CH1 is expired. When the backoff counter for the basic primary channel CH1 is expired in the APCH ready state and the alternative primary channel CH8 is maintained to be idle until the corresponding time, the terminal transmits the data by using both the basic channel group and the alternative channel group. In this case, based on the CCA result for each of the secondary channels for the PIFS time before the backoff counter for the basic primary channel CH1 is expired, the terminal performs the bandwidth extension based on the basic primary channel CH1 and the bandwidth extension based on the alternative primary channel CH8. Accordingly, in the exemplary embodiment of FIG. 20, the terminal transmits the data by using the basic channel group having the 40 MHz bandwidth and the alternative channel group having the 80 MHz bandwidth.

Meanwhile, when the interference occurs in the alternative primary channel CH8 in the APCH ready state and thus the corresponding channel becomes busy, the terminal cancels the APCH ready state. In this case, the terminal is allocated with a new backoff counter for the alternative primary channel CH8 and performs a backoff procedure for the alternative primary channel CH8 by using the new backoff counter when the busy state of the alternative primary channel CH8 ends.

FIG. 21 illustrates an exemplary embodiment in which the backoff counter for the basic primary channel CH1 is expired earlier than the backoff counter for the alternative primary channel CH8. When the backoff counter for the basic primary channel CH1 is expired earlier, the terminal transmits the data by using only the basic channel group. However, the data is not transmitted through the alternative primary channel CH8 in which the backoff counter is not expired. Accordingly, in the exemplary embodiment of FIG. 21, the terminal transmits the data by using the basic channel group having the 40 MHz bandwidth. According to an exemplary embodiment of the present invention, when the backoff counter for the basic primary channel CH1 is expired, the backoff counter for the alternative primary channel CH8 may be suspended while the data is transmitted through the basic primary channel CH1.

Meanwhile, according to yet another exemplary embodiment of the present invention, the terminal may transmit the data through the alternative primary channel independently regardless of whether the data is transmitted through the basic primary channel. That is, even when the basic primary channel is busy and the terminal may not thus use the basic primary channel, the terminal may transmit the data by using the alternative primary channel.

Figure 22:
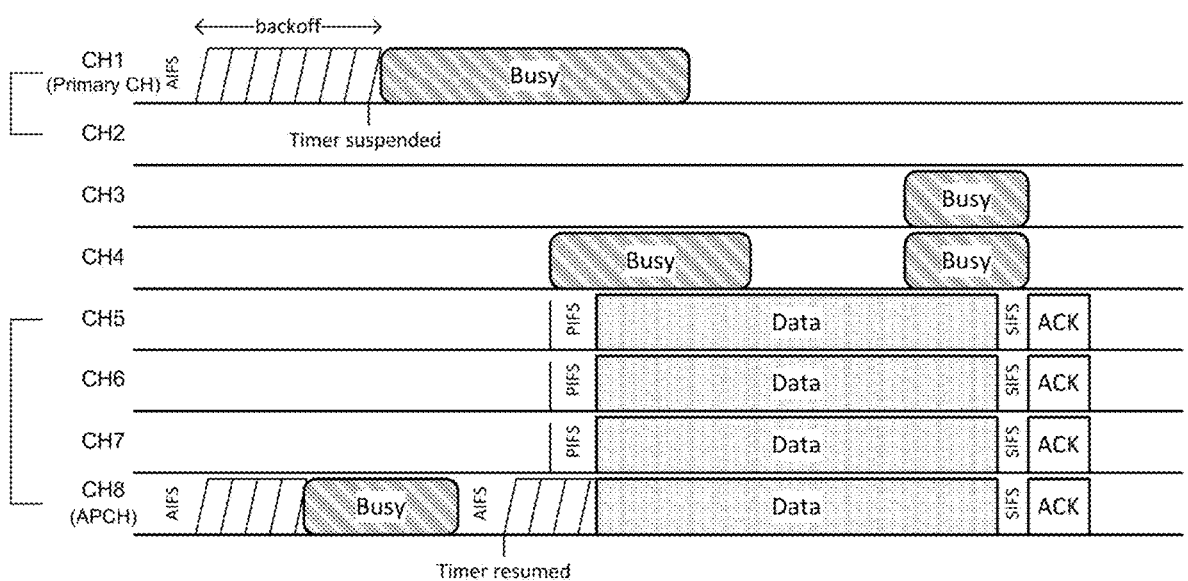

FIG. 22 illustrates an exemplary embodiment of independently using the alternative primary channel. According to the exemplary embodiment of FIG. 22, the backoff procedures are performed for the basic primary channel CH1 and the alternative primary channel CH8 by using the common backoff counter and in the backoff procedures of each channel, the common backoff counter is suspended only when both the basic primary channel CH1 and the alternative primary channel CH8 are busy. However, when at least one of the basic primary channel CH1 and the alternative primary channel CH8 is idle, the common backoff counter is resumed. The terminal may transmit the data by using the primary channel(s) which is idle when the common backoff counter is expired. That is, when both the basic primary channel CH1 and the alternative primary channel CH8 are idle, the terminal transmits the data by using both the basic channel group and the alternative channel group. In addition, when only any one of both channels is idle, the terminal transmits the data only through the channel group including the idle primary channel.

Referring to FIG. 22, the alternative primary channel CH8 becomes busy earlier while the backoff procedures for the basic primary channel CH1 and the alternative primary channel CH8 are performed, but since the basic primary channel CH1 is idle, the common backoff counter is not suspended. However, when the basic primary channel CH1 becomes additionally busy so that both channels CH1 and CH8 become busy, the common backoff counter is suspended. According to the exemplary embodiment of FIG. 22, while the common backoff counter is suspended, the alternative primary channel CH8 returns to be idle again and the common backoff counter is resumed again after an AIFS time. When the common backoff counter is expired, the basic primary channel CH1 is busy, while the alternative primary channel CH8 is idle. Therefore, the terminal transmits the data by using the alternative channel group including the idle alternative primary channel CH8.

Figure 23:
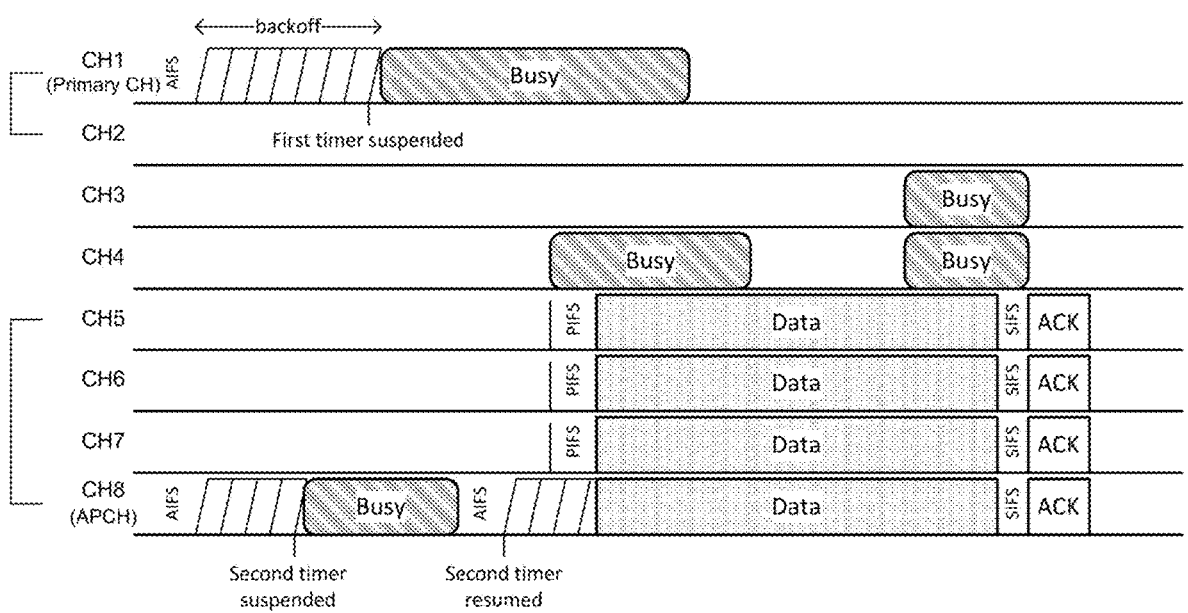

FIG. 23 illustrates another exemplary embodiment of independently using the alternative primary channel. According to the exemplary embodiment of FIG. 23, the backoff procedure of the alternative primary channel CH8 may be performed independently from the backoff procedure of the basic primary channel CH1. In this case, the backoff counter for the alternative primary channel CH8 may be set equal to the backoff counter for the basic primary channel CH1. Alternatively, the backoff counter for the alternative primary channel CH8 may be set as a separate backoff counter.

That is, in the exemplary embodiment of FIG. 23, the terminal is separately allocated with a first backoff counter (i.e. timer) for the basic primary channel CH1 and a second backoff counter (i.e. timer) for the alternative primary channel CH8. In this case, the terminal may perform the backoff procedures for the respective primary channels CH1 and CH8 by using the allocated individual backoff counters. Referring to FIG. 23, the terminal performs the backoff procedure for the basic primary channel CH1 by using the first backoff counter and suspends the first backoff counter when the basic primary channel CH1 is busy. Similarly, the terminal performs the backoff procedure for the alternative primary channel CH8 by using the second backoff counter and suspends the second backoff counter when the alternative primary channel CH8 is busy. As illustrated in FIG. 23, while the second backoff counter is suspended, the alternative primary channel CH8 returns to be idle again and the terminal resumes the second backoff counter after an AIFS time. When the second backoff counter is expired, the terminal transmits the data by using the alternative channel group including the alternative primary channel CH8.

The aforementioned exemplary embodiments of the present invention may be used for data transmission of the terminal through combination with Orthogonal Frequency Division Multiple Access (OFDMA). That is, the channels secured by the aforementioned exemplary embodiments may be allocated to one terminal, but alternatively allocated to a plurality of terminals in a wireless LAN system to which the OFDMA is applied.

Meanwhile, when the terminal uses the wideband channel through the bandwidth extension in a dense BSS environment as described above, channel access opportunities of other adjacent BSS terminals may be deprived. Therefore, when the terminal intends to transmit the data by using the wideband channel, a method for maintaining the fairness of the data transmission opportunity with the other BSS terminals is required.

Figure 24:
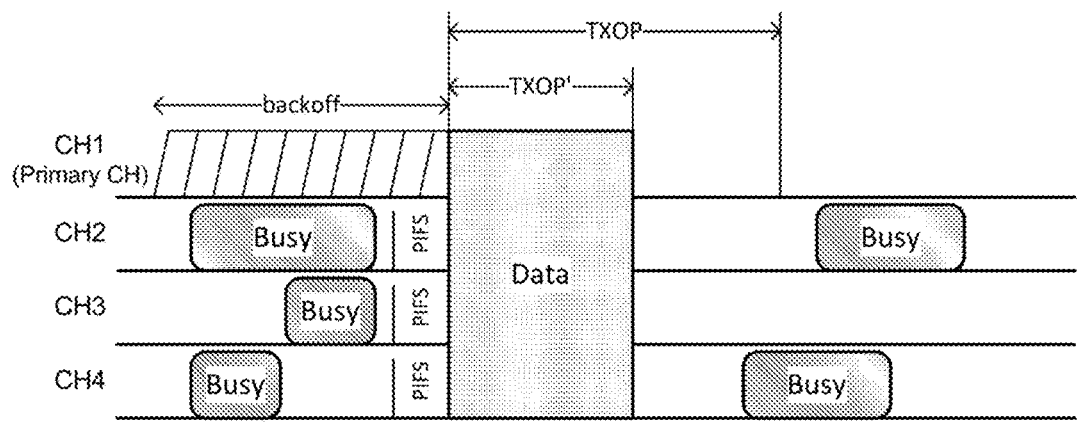
FIGS. 24 to 26 are diagrams illustrating various methods for transmitting data when a terminal uses a wideband channel according to an exemplary embodiment of the present invention.
Figure 25:
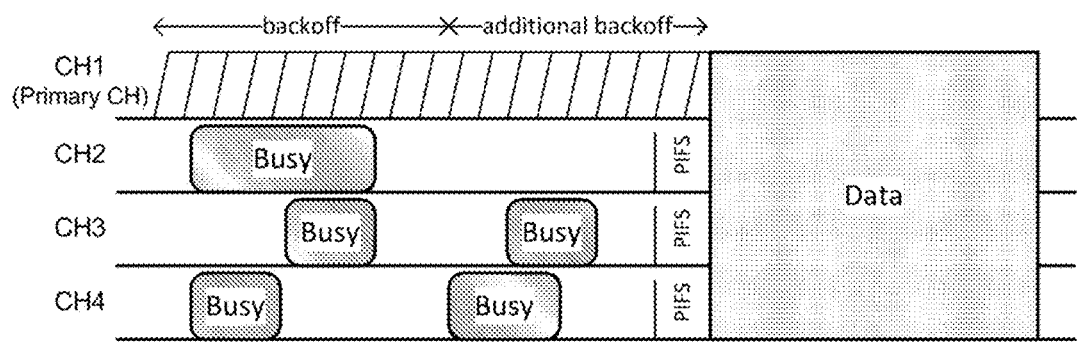
Figure 26:
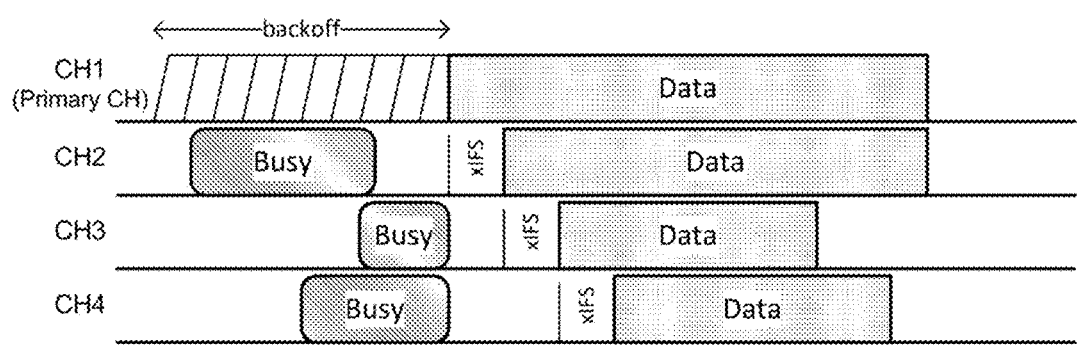

FIGS. 24 to 26 are diagrams illustrating various methods for transmitting data when a terminal uses a wideband channel according to an exemplary embodiment of the present invention. In the exemplary embodiment of FIGS. 24 to 26, CH1 is set as the primary channel and duplicated description of parts which are the same as or correspond to the aforementioned exemplary embodiment will be omitted.

First, FIG. 24 is a diagram illustrating an exemplary embodiment of a data transmitting method using the wideband channel. According to the exemplary embodiment of FIG. 24, when the terminal transmits the data by using the wideband channel, the terminal may adjust a transmission opportunity (TXOP) of the corresponding data. The TXOP means a guaranteed time for a terminal to continuously transmit packet(s). According to an exemplary embodiment, when the terminal transmits the data through the wideband channel including a plurality of basic channels, the terminal may transmit the data based on TXOP' (i.e. adjusted TXOP) having a smaller value than an original TXOP. In this case, the basic channel may represent a channel having a basic bandwidth (e.g., 20 MHz) set for a data transmission.

As described in the aforementioned exemplary embodiment, the terminal which intends to transmit the data performs the backoff procedure for the primary channel CH1 and performs the CCA for the secondary channels CH2 to CH4 for the PIFS time before the backoff counter of the backoff procedure is expired to determine whether each channel is usable. When at least one idle secondary channel which can be associated with the primary channel CH1 is present, the terminal transmits the data through the wideband channel in which the primary channel CH1 and the idle channel is associated with each other. In this case, the terminal may transmit the data based on the adjusted TXOP (i.e., TXOP').

Table 1 shows Enhanced Distributed Coordination Access (EDCA) parameter values set according to an access category (AC). In Table 1, the access category includes an access category AC_BK of a background state, an access category AC_BE of a best effort state, an access category AC_VI of video data, an access category AC_VO of voice data, and a legacy distributed coordination function (DCF). Further, the parameters include a minimum value CWmin of a contention window, a maximum value CWmax of a contention window, an AIFS value AIFSN, a maximum TXOP, and the adjusted TXOP (i.e. TXOP').

TABLE 1

| AC | CWmin | CWmax | AIFSN | Max TXOP | TXOP' |
|---|---|---|---|---|---|
| Background (AC_BK) | 15 | 1023 | 7 | 0 | A' |
| Best Effort (AC_BE) | 15 | 1023 | 3 | 0 | A' |
| Video (AC_VI) | 7 | 15 | 2 | 3.008 ms | B' < 3.008 ms |
| Voice (AC_VO) | 3 | 7 | 2 | 1.504 ms | B' < 1.504 ms |
| Legacy DCF | 15 | 1023 | 2 | 0 | A' |

As shown in Table 1, a TXOP' of data transmitted through the wideband channel may be determined to be a predetermined value A' or a value B' smaller than an original TXOP in the corresponding access category. According to an exemplary embodiment of the present invention, the TXOP' of the data transmitted through the associated wideband channel may have a relationship with the predetermined TXOP as shown in an equation given below.

$$TXOP' = \beta TXOP \quad \text{[Equation 1]}$$

Where, $\beta$ is a constant value which is inverse proportional to the number of basic channels occupied by the corresponding terminal. For example, if the bandwidth of the basic channel is 20 MHz, $\beta$ is set to 1/2 when the terminal transmits data with the bandwidth of 40 MHz, and $\beta$ may be set to 1/3 when the terminal transmits data with the bandwidth of 60 MHz. That is, when the terminal transmits data by using a bandwidth which is n times larger than the basic channel, the TXOP' value may be adjusted to 1/n of the predetermined TXOP. However, in the present invention, a method for setting the TXOP' is not limited thereto and as the bandwidth of the wideband channel used by the terminal is larger, the TXOP' may be set to a smaller value.

According to an additional exemplary embodiment of the present invention, secondary channel(s) separated from the primary channel in addition to secondary channel(s) adjacent to the primary channel may be associated with the primary channel to be used for transmitting the data. In this case, the bandwidth which can be occupied by the terminal may be set to a value which is integer times larger than the basic channel as 20 MHz, 40 MHz, 60 MHz, 80 MHz, 100 MHz, 120 MHz, 140 MHz, 160 MHz, and the like. Similarly even in this case, the terminal may set the TXOP' of the data based on the number of secondary channels associated with the primary channel. That is, as the number of secondary channels associated with the primary channel is larger, the TXOP' may be set to be smaller. Meanwhile, according to another exemplary embodiment, a channel having the smaller bandwidth than the basic channel may be used for the data transmission according to a design of the communication system. When the data is transmitted through a channel having the smaller bandwidth than the basic channel as described above, $\beta$ is set to a value larger than 1 to allocate a TXOP' having the larger value than the predetermined TXOP to the corresponding data.

Meanwhile, according to the exemplary embodiment of the present invention, $\beta$ which is a constant for determining the TXOP' may be determined by reflecting an additional weighted value as well as the wideband channel used by terminal. According to an exemplary embodiment, the terminal may determine an available situation of the channel by using information such as a control frame received during a predetermined interval before the present time, and the like and adjust the weighed value for the constant $\beta$ based on the determined channel available situation. The weighted value may determine a change amount of the TXOP' depending on a change in the number of basic channels occupied by the terminal. For example, the weighted value may be determined as $1/\beta$ under a situation in which the terminal may sufficiently exclusively occupy the wideband channel and in this case, the TXOP' depending on the use of the wideband channel may be set to the same value as the original TXOP.

FIG. 25 illustrates another exemplary embodiment of the data transmitting method using the wideband channel. According to the exemplary embodiment of FIG. 25, when the terminal transmits the data by using the wideband channel, the terminal may increase the size of the backoff counter used in the backoff procedure of the corresponding terminal.

As described above, the backoff counter for the backoff procedure of the primary channel is determined as the random number value within the contention window (CW) range set in the corresponding terminal. Herein, the contention window (CW) of each terminal is determined between the minimum value CWmin of the contention window and the maximum value CWmax of the contention window. That is, the contention window (CW) of each terminal is initialized to the minimum value CWmin of the contention window and a terminal in which a collision occurs in the backoff procedure increases the contention window (CW) in a range within the maximum value CWmax of the contention window (for example, two times larger than the previous contention window). As the contention window (CW) set for the terminal increases, the corresponding terminal has the higher probability to be allocated with the backoff counter having the larger value.

According to an exemplary embodiment of the present invention, when the terminal transmits data by using the wideband channel, the value of the contention window (CW) set for the corresponding terminal may increase. For example, the minimum value CWmin of the contention window and the maximum value CWmax of the contention window may be basically set as enumerated in Table 1 according to a traffic type. In this case, as the bandwidth of the wideband channel used by the terminal increases, at least one of the minimum value CWmin of the contention window and the maximum value CWmax of the contention window set for the corresponding terminal may increase.

According to another exemplary embodiment of the present invention, when the terminal transmits the data by using the wideband channel, the corresponding terminal may extract a plurality of backoff counter candidate values within the set contention window (CW) range and allocate the largest value among the extracted backoff counter candidate values to the backoff counter for the corresponding terminal. For example, when the terminal transmits the data by using the bandwidth which is n times larger than the basic channel, n backoff counter candidate values may be randomly extracted within the contention window (CW) range set for the corresponding terminal. In this case, the terminal may set the largest value among n extracted backoff counter candidate values as the backoff counter for the primary channel of the corresponding terminal.

A probability that a value z will be randomly extracted within the set contention window value CW is 1/CW. However, as described above, f(z) which is a probability that n values being randomly extracted within the contention window value CW and z become the largest value among n extracted values is shown in an equation given below.

$$f(z) = \frac{n}{CW}\left(\frac{z}{CW}\right)^{n-1}$$ [Equation 2]

Accordingly, as n which is the number of times of extracting the backoff counter candidate value increases, a probability that z which is the largest value among the backoff counter candidate values will become a value close to the contention window value CW increases.

Meanwhile, the terminal may determine an available situation of the channel by using the information such as the control frame received during the predetermined interval before the present time, and the like and adjust the increase probability of the backoff counter based on the determined channel available situation. For example, the terminal may decrease an increase amount of the contention window (CW) value set for the corresponding terminal as the channel available situation is better. To this end, the terminal may decrease the increase amounts of the minimum value CWmin of the contention window and the maximum value CWmax of the contention window. Similarly, the terminal may decrease n which is the number of times of extracting the backoff counter candidate value for the corresponding terminal as the channel available situation is better. As such, when the channel available situation is better, an unnecessary backoff procedure in a non-contention state may be prevented by decreasing the increase amount of the contention window (CW) and n which is the number of times of extracting the backoff counter candidate value.

As such, according to the exemplary embodiment of the present invention, when the terminal transmits the data by using the wideband channel, the additional backoff counter is derived to be used in the backoff procedure to maintain the fairness of the data transmission opportunity with the terminals of another BSS.

FIG. 26 illustrates yet another exemplary embodiment of the data transmitting method using the wideband channel. According to the exemplary embodiment of FIG. 26, when the terminal transmits the data by using the wideband channel, the bandwidth extension from the primary channel may be gradually performed.

As described in the aforementioned exemplary embodiment, the terminal which intends to transmit the data performs the backoff procedure for the primary channel CH1 and when the backoff counter is expired, the terminal transmits the data by using the primary channel CH1. However, unlike the previous exemplary embodiments, the terminal performs the CCA for the secondary channel for the xIFS time after the backoff counter is expired to determine whether the corresponding channel is usable. In this case, the xIFS may be set to PIFS as described in the previous exemplary embodiments regarding the bandwidth extension or alternatively set to another value. When the corresponding secondary channel is idle for the set xIFS time, the terminal transmits the data by using the corresponding secondary channel together with the primary channel CH1. The terminal repeats the same process with respect to an additional secondary channel for the xIFS time after starting the occupation of the secondary channel.

The terminal may extend the bandwidth by the unit of one channel while performing the bandwidth extension, and alternatively extend the bandwidth by the unit of a predetermined number of channels. Further, an order to add the secondary channel for the bandwidth extension may be determined based on a merging or association order with the primary channel according to the wideband allocation rule, but the present invention is not limited thereto. As such, according to the exemplary embodiment of FIG. 26, when the terminal performs channel extension for using the wideband channel, the terminal may gradually extend the channel with a time difference of the predetermined xIFS to grant an opportunity in which other communication terminals may start the communication.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal for accessing a plurality of contention-based channels, the terminal comprising: a wireless communication module; and a processor coupled to a memory, wherein the processor is configured to: perform backoff procedure for a plurality of channels, wherein each of a plurality of backoff counters individually corresponding to a respective channel of the plurality of channels is selected, and wherein an initial value of each of the plurality of backoff counters is set based on a common backoff counter used by the wireless communication terminal for multi-channel access, and perform multi-channel transmission through the plurality of channels based on the backoff procedure using the plurality of backoff counters, wherein the multi-channel transmission is performed through the plurality of channels when the plurality of backoff counters are '0'.

2. The wireless communication terminal of claim 1, wherein each of the plurality of backoff counters is selectivity decremented when a channel state for the respective channel among the plurality of channels is idle.

3. The wireless communication terminal of claim 1, wherein the initial value of each of the plurality of back off counters is set to a same value based on the common back off counter.

4. The wireless communication terminal of claim 1, wherein the backoff procedure for the respective channel of the plurality of channels is independently performed based on a corresponding backoff counter among the plurality of backoff counters.

5. The wireless communication terminal of claim 1, wherein the backoff procedure for at least one of the plurality of channels is deferred.

6. A wireless communication method of a terminal for accessing a plurality of contention-based channels, the method comprising:

performing backoff procedure for a plurality of channels, wherein each of a plurality of backoff counters individually corresponding to a respective channel of the plurality of channels is selected, and wherein an initial value of each of the plurality of backoff counters is set based on a common backoff counter used by the wireless communication terminal for multi-channel access; and performing multi-channel transmission through the plurality of channels based on the backoff procedure using the plurality of backoff counters, wherein the multi-channel transmission is performed through the plurality of channels when the plurality of backoff counters are '0'.

7. The wireless communication method of claim 6, wherein each of the plurality of backoff counters is selectivity decremented when a channel state for the respective channel among the plurality of channels is idle.

8. The wireless communication method of claim 6, wherein the initial value of each of the plurality of back off counters is set to a same value based on the common back off counter.

9. The wireless communication method of claim 6, wherein the backoff procedure for the respective channel of the plurality of channels is independently performed based on a corresponding backoff counter among the plurality of backoff counters.

10. The wireless communication method of claim 6, wherein the backoff procedure for at least one of the plurality of channels is deferred.

11. A wireless communication terminal for accessing a plurality of contention-based channels, the terminal comprising: a wireless communication module; and a processor coupled to a memory, wherein the processor is configured to: receiving a signal from a base station according to multi-channel access procedure through a plurality of channels, wherein the multi-channel access procedure for each of the plurality of channels is performed based on a backoff counter individually corresponding among the plurality of backoff counters, wherein an initially value of each of the plurality of backoff counters is set based on a common backoff counter used by the wireless communication terminal for multi-channel access, and wherein the signal is received through an at least one channel when an at least one backoff counter for the at least one channel corresponding to the terminal among the plurality of channels is '0'.

* * * * *